United States Patent
Adcock et al.

(10) Patent No.: US 7,877,316 B2
(45) Date of Patent: Jan. 25, 2011

(54) REPRICE-TO-BLOCK ORDER

(75) Inventors: Paul D. Adcock, Burr Ridge, IL (US);
Michael A. Cormack, Evanston, IL (US); Thomas F. Haller, Longwood, FL (US); Robert A. Hill, LaGrange, IL (US)

(73) Assignee: Archipelago Holdings, Inc., Chicago, IL (US)

( * ) Notice: Subject to any disclaimer, the term of this patent is extended or adjusted under 35 U.S.C. 154(b) by 425 days.

(21) Appl. No.: 11/416,942

(22) Filed: May 3, 2006

(65) Prior Publication Data
US 2006/0253381 A1  Nov. 9, 2006

Related U.S. Application Data

(60) Provisional application No. 60/678,108, filed on May 5, 2005.

(51) Int. Cl.
G06Q 40/00 (2006.01)

(52) U.S. Cl. .............................. 705/37; 705/35; 705/26

(58) Field of Classification Search .................. 705/26, 705/35, 37
See application file for complete search history.

(56) References Cited

U.S. PATENT DOCUMENTS

| | | | |
|---|---|---|---|
| 5,101,353 A | 3/1992 | Lupien et al. | |
| 5,560,580 A | 10/1996 | Almoslino | |
| 5,845,266 A | 12/1998 | Lupien et al. | |
| 5,905,974 A | 5/1999 | Fraser et al. | |
| 5,950,176 A | 9/1999 | Keiser et al. | |
| 6,012,046 A | 1/2000 | Lupien et al. | |
| 6,098,051 A | 8/2000 | Lupien et al. | |
| 6,278,982 B1 | 8/2001 | Korhammer et al. | |
| 6,343,278 B1 | 1/2002 | Jain et al. | |
| 6,377,940 B2 | 4/2002 | Tilfors et al. | |
| 6,405,180 B2 | 6/2002 | Tilfors et al. | |
| 6,408,282 B1 | 6/2002 | Buist | |
| 6,505,174 B1 | 1/2003 | Keiser et al. | |
| 6,615,188 B1 | 9/2003 | Breen et al. | |
| 6,618,707 B1 | 9/2003 | Gary | |
| 6,714,948 B1 | 3/2004 | Richards | |
| 6,829,589 B1 | 12/2004 | Saliba | |
| 6,832,210 B1 | 12/2004 | Li | |
| 6,850,907 B2 | 2/2005 | Lutnick et al. | |
| 6,963,856 B2 | 11/2005 | Lutnick et al. | |
| 6,983,260 B2 | 1/2006 | Hummelgren | |
| 7,162,448 B2 | 1/2007 | Madoff et al. | |
| 7,184,982 B1 | 2/2007 | Howorka et al. | |
| 7,197,483 B2 | 3/2007 | Brady et al. | |
| 7,209,896 B1 | 4/2007 | Serkin et al. | |
| 7,225,153 B2 | 5/2007 | Lange | |
| 7,242,669 B2 | 7/2007 | Bundy et al. | |
| 7,246,090 B1 | 7/2007 | Thomas | |
| 7,246,093 B1 | 7/2007 | Katz | |
| 7,249,086 B2 | 7/2007 | Bloom et al. | |
| 7,356,498 B2 | 4/2008 | Kaminsky et al. | |
| 7,383,220 B1 | 6/2008 | Keith | |

(Continued)

FOREIGN PATENT DOCUMENTS

AU   2006/244564   11/2006

(Continued)

OTHER PUBLICATIONS

Lee W. Young, "International Search Report", Sep. 29, 2007, 6 pages.

(Continued)

*Primary Examiner*—Jagdish N Patel
*Assistant Examiner*—Sara Chandler
(74) *Attorney, Agent, or Firm*—Milbank Tweed Hadley & McCloy LLP

(57) ABSTRACT

A reprice-to-block order and related market center and process are disclosed which automatically reprice a posted limit order to the price of a block trade executed at an inferior price on a market away from the market center that posted the limit order.

14 Claims, 7 Drawing Sheets

U.S. PATENT DOCUMENTS

| | | |
|---|---|---|
| 7,401,046 B2 | 7/2008 | Hollerman et al. |
| 7,467,110 B2 | 12/2008 | Muller et al. |
| 7,685,057 B2 | 3/2010 | Chiulli et al. |
| 2001/0037284 A1 | 11/2001 | Finkelstein et al. |
| 2002/0010672 A1 | 1/2002 | Waelbroeck et al. |
| 2002/0010673 A1 | 1/2002 | Muller et al. |
| 2002/0019795 A1 | 2/2002 | Madoff et al. |
| 2002/0019799 A1 | 2/2002 | Ginsberg et al. |
| 2002/0042765 A1 | 4/2002 | Dawson |
| 2002/0062273 A1 | 5/2002 | Perkel et al. |
| 2002/0082979 A1 | 6/2002 | Sands et al. |
| 2002/0091617 A1 | 7/2002 | Keith |
| 2002/0091621 A1 | 7/2002 | Conklin et al. |
| 2002/0128951 A1 | 9/2002 | Kiron et al. |
| 2002/0128955 A1 | 9/2002 | Brady et al. |
| 2002/0128958 A1 | 9/2002 | Slone |
| 2002/0143676 A1 | 10/2002 | Kiron et al. |
| 2002/0147670 A1 | 10/2002 | Lange |
| 2002/0161687 A1 | 10/2002 | Serkin et al. |
| 2002/0169703 A1 | 11/2002 | Lutnick et al. |
| 2002/0184135 A1 | 12/2002 | Zakaria |
| 2002/0184136 A1 | 12/2002 | Cleary |
| 2002/0198815 A1 | 12/2002 | Greifeld et al. |
| 2002/0198816 A1 | 12/2002 | Gilbert et al. |
| 2003/0004851 A2 | 1/2003 | Kiron et al. |
| 2003/0004858 A1 | 1/2003 | Schmitz et al. |
| 2003/0009400 A2 | 1/2003 | Kiron et al. |
| 2003/0009412 A1 | 1/2003 | Furbush et al. |
| 2003/0009413 A1 | 1/2003 | Furbush et al. |
| 2003/0009414 A1 | 1/2003 | Furbush et al. |
| 2003/0014351 A1 | 1/2003 | Neff et al. |
| 2003/0023536 A1 | 1/2003 | Hollerman et al. |
| 2003/0040955 A1 | 2/2003 | Anaya et al. |
| 2003/0041006 A1 | 2/2003 | Bunda |
| 2003/0083974 A1 | 5/2003 | Bunda |
| 2003/0093343 A1 | 5/2003 | Huttenlocher et al. |
| 2003/0097328 A1 | 5/2003 | Lundberg et al. |
| 2003/0115131 A1 | 6/2003 | Heaton et al. |
| 2003/0130920 A1 | 7/2003 | Freund |
| 2003/0130925 A1 | 7/2003 | Malitzis |
| 2003/0130926 A1 | 7/2003 | Moore |
| 2003/0135443 A1 | 7/2003 | Moore et al. |
| 2003/0139998 A1 | 7/2003 | Gilbert et al. |
| 2003/0172024 A1 | 9/2003 | Kokis et al. |
| 2003/0177082 A1 | 9/2003 | Buckwalter |
| 2003/0191703 A1 | 10/2003 | Chen et al. |
| 2003/0216932 A1 | 11/2003 | Foley |
| 2003/0229557 A1 | 12/2003 | Richmann et al. |
| 2003/0233307 A1 | 12/2003 | Salvadori et al. |
| 2004/0030630 A1 | 2/2004 | Tilfors et al. |
| 2004/0044610 A1 | 3/2004 | Fraser et al. |
| 2004/0059666 A1* | 3/2004 | Waelbroeck et al. .......... 705/37 |
| 2004/0088242 A1 | 5/2004 | Ascher et al. |
| 2004/0143538 A1 | 7/2004 | Korhammer et al. |
| 2004/0143542 A1 | 7/2004 | Magill et al. |
| 2004/0177024 A1 | 9/2004 | Bok et al. |
| 2004/0177026 A1 | 9/2004 | Balabon |
| 2004/0210508 A1 | 10/2004 | Bohnenberger |
| 2004/0210511 A1 | 10/2004 | Waelbroeck et al. |
| 2004/0215538 A1 | 10/2004 | Smith et al. |
| 2004/0225592 A1 | 11/2004 | Churquina |
| 2004/0236662 A1 | 11/2004 | Korhammer et al. |
| 2004/0236669 A1 | 11/2004 | Horst et al. |
| 2004/0243502 A1 | 12/2004 | Slowik et al. |
| 2004/0254804 A1 | 12/2004 | Peterffy et al. |
| 2004/0254877 A1 | 12/2004 | Buckwalter et al. |
| 2004/0267655 A1 | 12/2004 | Davidowitz et al. |
| 2005/0010481 A1 | 1/2005 | Lutnick et al. |
| 2005/0075963 A1* | 4/2005 | Balabon .......... 705/36 |
| 2005/0096999 A1 | 5/2005 | Newell et al. |
| 2005/0119964 A1 | 6/2005 | Brady et al. |
| 2005/0125316 A1 | 6/2005 | Levering et al. |
| 2005/0137962 A1 | 6/2005 | Penney et al. |
| 2005/0160024 A1 | 7/2005 | Soderborg et al. |
| 2005/0171887 A1 | 8/2005 | Daley et al. |
| 2005/0171888 A1 | 8/2005 | Daley et al. |
| 2005/0171889 A1 | 8/2005 | Daley et al. |
| 2005/0171890 A1 | 8/2005 | Daley et al. |
| 2005/0171891 A1 | 8/2005 | Daley et al. |
| 2005/0171895 A1 | 8/2005 | Howorka et al. |
| 2005/0197916 A1 | 9/2005 | Newell et al. |
| 2005/0222936 A1 | 10/2005 | Panariti et al. |
| 2005/0228739 A1 | 10/2005 | Leibowitz |
| 2005/0240510 A1 | 10/2005 | Schweickert et al. |
| 2005/0273407 A1 | 12/2005 | Black et al. |
| 2005/0273408 A1 | 12/2005 | Bandman et al. |
| 2005/0273419 A1 | 12/2005 | Ogg et al. |
| 2005/0283415 A1 | 12/2005 | Studnitzer et al. |
| 2005/0283421 A1 | 12/2005 | Hatheway et al. |
| 2005/0283426 A1 | 12/2005 | Krishnasami et al. |
| 2005/0283427 A1 | 12/2005 | Owens et al. |
| 2006/0020536 A1 | 1/2006 | Renton et al. |
| 2006/0031157 A1 | 2/2006 | Gianakouros et al. |
| 2006/0089898 A1 | 4/2006 | Durkin et al. |
| 2006/0089899 A1 | 4/2006 | Durkin et al. |
| 2006/0136318 A1 | 6/2006 | Rafieyan et al. |
| 2006/0136326 A1 | 6/2006 | Heckman et al. |
| 2006/0149659 A1 | 7/2006 | Carone et al. |
| 2006/0161494 A1 | 7/2006 | Littlewood |
| 2006/0184444 A1 | 8/2006 | McConaughy et al. |
| 2006/0206404 A1 | 9/2006 | Hatheway et al. |
| 2006/0206407 A1 | 9/2006 | Troxel et al. |
| 2006/0235786 A1 | 10/2006 | DiSalvo |
| 2006/0253374 A1 | 11/2006 | Addock et al. |
| 2006/0259391 A1 | 11/2006 | Schoen et al. |
| 2006/0277137 A1 | 12/2006 | Claus et al. |
| 2006/0277138 A1 | 12/2006 | Ross et al. |
| 2007/0022041 A1 | 1/2007 | Durkin et al. |
| 2007/0043647 A1 | 2/2007 | Bickford |
| 2007/0055607 A1 | 3/2007 | Wunsch et al. |
| 2007/0078753 A1 | 4/2007 | Cormack et al. |
| 2007/0112693 A1 | 5/2007 | Cushing |
| 2007/0198391 A1 | 8/2007 | Dreyer et al. |
| 2007/0244792 A1 | 10/2007 | Couperier et al. |
| 2008/0040290 A1 | 2/2008 | Harris |
| 2010/0030704 A1 | 2/2010 | Griffin et al. |

FOREIGN PATENT DOCUMENTS

| | | |
|---|---|---|
| EP | 1 321 870 | 6/2003 |
| WO | WO 01/07039 | 2/2001 |
| WO | WO 01/09008 | 2/2001 |
| WO | WO 01/22322 | 3/2001 |
| WO | WO 01/22339 | 3/2001 |
| WO | WO 01/52166 | 7/2001 |
| WO | WO 01/75733 | 10/2001 |
| WO | WO 01/90925 | 11/2001 |
| WO | WO 2004/008296 | 1/2004 |
| WO | WO 2005/010790 | 2/2005 |
| WO | WO 2005/036354 | 4/2005 |
| WO | 2006016683 | 5/2006 |
| WO | 2006016684 | 5/2006 |
| WO | 2006016685 | 5/2006 |
| WO | 2006016701 | 5/2006 |
| WO | 2006017249 | 5/2006 |
| WO | 2006017253 | 5/2006 |
| WO | 2006017296 | 5/2006 |
| WO | 2006036461 | 9/2006 |
| WO | 2006036878 | 9/2006 |
| WO | 2007016571 | 7/2007 |
| WO | 2007016572 | 7/2007 |
| WO | 2007016682 | 7/2007 |
| WO | 2007016718 | 7/2007 |
| WO | 2007016856 | 7/2007 |

| WO | 2007016857 | 7/2007 |
| WO | 2007024921 | 12/2007 |
| WO | 2008/510109 | 4/2008 |

OTHER PUBLICATIONS

International Search Report, Oct. 2, 2009 for SG2007166812.
International Search Report, Oct. 14, 2009 for SG2007166754.
Response to Final, Oct. 19, 2009 for U.S. Appl. No. 11/416,913.
NASDAQ Launches Liquidity Tracker, HighBeam Research, Dec. 5, 2002.
Response to Nonfinal, Sep. 29, 2009 for U.S. Appl. No. 11/634,020.
Nonfinal Rejection, Aug. 17, 2009 for U.S. Appl. No. 11/416,710.
Response to Nonfinal, Nov. 2, 2009 for U.S. Appl. No. 11/416,710.
Nonfinal Rejection, Oct. 7, 2009 for U.S. Appl. No. 11/345,421.
Response to Nonfinal, Nov. 4, 2009 for U.S. Appl. No. 11/416,756.
Nov. 16, 2009 Notice of Allowance for U.S. Appl. No. 11/345,420.
Nov. 23, 2009 Response to Nonfinal for U.S. Appl. No. 11/345,421.
Nov. 16, 2009 Response to Nonfinal for U.S. Appl. No. 11/525,363.
Aug. 12, 2009 Nonfinal Rejection for U.S. Appl. No. 11/527,797.
Nov. 17, 2009 Response to Nonfinal for U.S. Appl. No. 11/527,797.
Nov. 6, 2009 Nonfinal Rejection for U.S. Appl. No. 11/880,686.
U.S. Appl. No. 11/416,710.
International Search Report & Written Opinion, PCT/US07/16856, Nov. 10, 2008.
International Search Report for PCT/US06/16685, Sep. 17, 2007.
International Preliminary Report on Patentability, PCT/US2007/016572, Apr. 23, 2009.
International Preliminary Report on Patentability, PCT/US2007/024921, Jun. 18, 2009.
McKinnion, Julie M., Toldeo Ohio-Based Dana Corp. Could Lose NYSE Listing in Takeover Battle, The Blade, Aug. 3, 2003.
Young, Lee, W., International Search Report May 18, 2007, 4 pages.
Young, Lee, W., International Search Report Sep. 12, 2007, 6 pages.
Young, Lee, W., International Search Report Aug. 9, 2007, 6 pages.
Young, Lee, W., International Search Report Aug. 29, 2007, 7 pages.
Young, Lee, W., International Search Report Sep. 5, 2007, 8 pages.
Young, Lee, W., International Search Report Sep. 7, 2007, 5 pages.
International Search Report, Mar. 20, 2008 for PCT/US2007/016718.
Australian Patent Office Written Opinion & Search Report, mailed Dec. 1, 2008.
Australian Patent Office Written Opinion & Search Report, mailed Jan. 9, 2009.
Australian Patent Office Written Opinion & Search Report, mailed Feb. 13, 2009.
International Search Report, Jul. 2, 2008 for PCT/US2007/016572.
Austrian Patent Office Search Report and Written Opinion, mailed Mar. 13, 2009.
Phlx Allows Floor Broker Crossing, Wall Street Letter, New York, Feb. 24, 2003, p. 1.
Anonymous, Rising tide lifts all boats in institutional equities, The Investment Dealers' digest: IDD, New York, Mar. 28, 1994, vol. 60, Iss. 13, p. 16, 5 pages.
Headstrong Buys assets of Elind Software Provider; Noticiasfinancieras, Miami Nov. 1, 2004, p. 1.
Non-Final Rejection, Feb. 26, 2008.
Response to Non-Final, Aug. 29, 2008 for U.S. Appl. No. 11/122,689.
Final Rejection, Nov. 18, 2008 for U.S. Appl. No. 11/122,689.
Response to Final, Mar. 17, 2009 for U.S. Appl. No. 11/122,689.
Examiner Interview, Apr. 13, 2009 for U.S. Appl. No. 11/122,689.
Non-Final Rejection, Apr. 27, 2009 for U.S. Appl. No. 11/122,689.
Non-Final Rejection, Apr. 1, 2008 for U.S. Appl. No. 11/122,679.
Response to Non-Final, Oct. 6, 2008 for U.S. Appl. No. 11/122,679.
Non-Final Rejection, Jan. 5, 2009 for U.S. Appl. No. 11/122,679.
Response to Non-Final, Apr. 6, 2009 for U.S. Appl. No. 11/122,679.
Examiner Interview, May 4, 2009 for U.S. Appl. No. 11/122,679.
Response to Non-Final, Jun. 17, 2009 for U.S. Appl. No. 11/122,679.
Non-Final Rejection, Dec. 9, 2008 for U.S. Appl. No. 11/345,420.
Response to Non-Final, Mar. 16, 2009 for U.S. Appl. No. 11/345,420.
Notice of Allowance, Jul. 23, 2009 for U.S. Appl. No. 11/345,420.
Non-Final Rejection, Feb. 12, 2008 for U.S. Appl. No. 11/122,498.
Response to Non-Final, Aug. 14, 2008 for U.S. Appl. No. 11/122,498.
Final Rejection, Sep. 19, 2008 for U.S. Appl. No. 11/122,498.
Response to Final, Jan. 9, 2009 for U.S. Appl. No. 11/122,498.
Non-Final Rejection, Apr. 15, 2009 for U.S. Appl. No. 11/122,498.
Non-Final Rejection, Jun. 27, 2008 for U.S. Appl. No. 11/345,421.
Response to Non-Final, Sep. 22, 2008 for U.S. Appl. No. 11/345,421.
Final Rejection, Jan. 26, 2009 for U.S. Appl. No. 11/345,421.
Response to Final, May 22, 2009 for U.S. Appl. No. 11/345,421.
International Search Report, Sep. 5, 2008 for PCT/US2007/016857.
International Search Report, Sep. 18, 2008 for PCT/US2007/016856.
International Search Report, Nov. 10, 2008 for PCT/US2007/016856.
Non-Final Rejection, Apr. 4, 2008 for U.S. Appl. No. 11/416,710.
Informal Response to Non-Final, Aug. 4, 2008 for U.S. Appl. No. 11/416,710.
Notice to Applicant re: Informal Response to Non-Final, Sep. 11, 2008 for U.S. Appl. No. 11/416,710.
Response to Non-Final, Sep. 19, 2008 for U.S. Appl. No. 11/416,710.
Non-Final Rejection, Dec. 30, 2008 for U.S. Appl. No. 11/416,710.
Response to Non-Final, Mar. 27, 2009 for U.S. Appl. No. 11/416,710.
Non-Final Rejection, Dec. 29, 2008 for U.S. Appl. No. 11/416,913.
Response to Non-Final, Mar. 25, 2009 for U.S. Appl. No. 11/416,913.
Final Rejection, Aug. 3, 2009 for U.S. Appl. No. 11/416,913.
Restriction Requirement, Mar. 27, 2009 for U.S. Appl. No. 11/416,756.
Response to Non-Final, Apr. 27, 2009 for U.S. Appl. No. 11/416,756.
Non-Final Rejection, Aug. 4, 2009 for U.S. Appl. No. 11/416,756.
Non-Final Rejection, Sep. 3, 2008 for U.S. Appl. No. 11/416,943.
Response to Non-Final, Dec. 5, 2008 for U.S. Appl. No. 11/416,943.
Final Rejection, Mar. 17, 2009 for U.S. Appl. No. 11/416,943.
Response to Final, Jun. 17, 2009 for U.S. Appl. No. 11/416,943.
Non-Final Rejection, May 19, 2009 for U.S. Appl. No. 11/525,363.
International Search Report, Jun. 17, 2008 for PCT/US2006/036461.
Non-Final Rejection, Sep. 15, 2008 for U.S. Appl. No. 11/527,797.
Response to Non-Final, Dec. 15, 2008 for U.S. Appl. No. 11/527,797.
Final Rejection, Mar. 30, 2009 for U.S. Appl. No. 11/527,797.
Response to Final, May 19, 2009 for U.S. Appl. No. 11/527,797.
Non-Final Rejection, Nov. 12, 2008 for U.S. Appl. No. 11/634,020.
Response to Non-Final, Feb. 17, 2009 for U.S. Appl. No. 11/634,020.
Non-Final Rejection, Jun. 24, 2009 for U.S. Appl. No. 11/634,020.
International Search Report, May 12, 2008 for PCT/US2007/024921.
International Search Report, Jun. 17, 2008 for PCT/US2007/016571.
International Search Report, Jun. 17, 2008 for PCT/US2007/016682.
Examiner Interview, Aug. 18, 2009 for U.S. Appl. No. 11/122,689.
Response to Nonfinal, Aug. 27, 2009 for U.S. Appl. No. 11/122,689.
Notice of Allowance, Aug. 21, 2009 for U.S. Appl. No. 11/122,679.
Examiner Interview, Sep. 9, 2009 for U.S. Appl. No. 11/122,679.
Examiner Interview Summary Record, Aug. 18, 2009 for U.S. Appl. No. 11/122,498.
Response to Nonfinal, Sep. 15, 2009 for U.S. Appl. No. 11/122,498.
Response to Final, Sep. 30, 2009 for U.S. Appl. No. 11/416,942.
Examiner Interview Summary Record, Mar. 31, 2009 for U.S. Appl. No. 11/416,943.
Nonfinal Rejection, Sep. 30, 2009 for U.S. Appl. No. 11/416,943.
U.S. Appl. No. 11/881,788.
U.S. Appl. No. 61/191,055.
U.S. Appl. No. 11/881,789.
U.S. Appl. No. 11/880,810.
U.S. Appl. No. 11/880,686.
U.S. Appl. No. 11/880,852.
U.S. Appl. No. 11/881,064.
U.S. Appl. No. 11/634,020.
U.S. Appl. No. 11/527,797.
U.S. Appl. No. 11/525,363.
U.S. Appl. No. 60/721,165.
U.S. Appl. No. 11/122,679.
U.S. Appl. No. 11/122,689.
U.S. Appl. No. 11/345,420.
U.S. Appl. No. 11/416,943.
U.S. Appl. No. 11/416,756.
U.S. Appl. No. 11/122,498.

U.S. Appl. No. 11/345,421.
U.S. Appl. No. 11/416,913.
A Taxonomy of Automated Trade Execution Systems, Ian Domowitz, Journal of International Money and Finance, (1993), 12, pp. 607-631.
Notice of Allowance, Dec. 14, 2009 for U.S. Appl. No. 11/122,689.
Response to Nonfinal, Oct. 14, 2009 for U.S. Appl. No. 11/416,943.
Final Rejection, Dec. 28, 2009 for U.S. Appl. No. 11/634,020.
Schnitzlein, Charles R., Call and Continuous Trading Mechanisms Under Asymmetric Information: An Experimental Investigation, The Journal of Finance, vol. 51, No. 2, Jun. 1996.
Jan. 21, 2010 Examiner Interview for U.S. Appl. No. 11/122,498.
Jan. 21, 2010 Final Rejection for U.S. Appl. No. 11/122,498.
Jan. 22, 2010 Nonfinal Rejection for U.S. Appl. No. 11/416,913.
Jan. 26, 2010 Final Rejection for U.S. Appl. No. 11/527,797.
Jan. 26, 2010 Notice of Allowance for U.S. Appl. No. 11/122,689.
Jan. 15, 2010 Notice of Allowance for U.S. Appl. No. 11/122,679.
Jan. 15, 2010 Notice of Allowability U.S. Appl. No. 11/122,679.
Tseng, K.C., Supermontage as a New Trading System of NASDAQ, Investment Management and Financial Innovations, Mar. 2005.
Roger D. Huang et al., Tick Size, Bid-Ask Spreads and Market Structure, Working Paper 99-05 Version: Feb. 8, 2001; Forthcoming Journal of Financial and Quant. Analysis p1-29.
Bart Frijns et al., Price discovery in tick time, Journal of Empirical Financial, vol. 16, Issue 5, Dec. 2009, p. 759-776.
Notice of Allowance for U.S. Appl. No. 11/122,689 on Mar. 1, 2010.
Jun. 16, 2010 Response to Final for U.S. Appl. No. 11/122,498.
Apr. 2, 2010 Notice of Allowance for U.S. Appl. No. 11/345,421.
Mar. 22, 2010 Notice of Allowance for U.S. Appl. No. 11/416,710.
Jun. 15, 2010 Notice of Allowance for U.S. Appl. No. 11/416,710.
Jun. 22, 2010 Response to Nonfinal U.S. Appl. No. 11/416,913.
Mar. 23, 2010 Nonfinal Rejection for U.S. Appl. No. 11/416,943.
Jun. 23, 2010 Response to Nonfinal for U.S. Appl. No. 11/416,943.
Mar. 17, 2010 Response to Final for U.S. Appl. No. 11/634,020.
Apr. 28, 2010 Nonfinal rejection for U.S. Appl. No. 11/634,020.
May 3, 2010 Response to Nonfinal for U.S. Appl. No. 11/880,686.
Dec. 1, 2010 Nonfinal Rejection for U.S. Appl. No. 11/881,789.
Mar. 19, 2010 Response to Nonfinal for U.S. Appl. No. 11/881,789.
Aug. 16, 2010 Notice of Allowance for U.S. Appl. No. 11/122,679.
Jul. 22, 2009 EIC3600 Search Report for U.S. Appl. No. 11/122,679.
Jul. 2, 2009 EIC3600 Search Report for U.S. Appl. No. 11/345,420.
Jul. 1, 2010 Notice of Allowance for U.S. Appl. No. 11/122,498.
Aug. 4, 2010 U.S. Appl. No. 11/345,421.
Jan. 30, 2009 Austrian Patent Office Search Report and Written Opinion for SG 200716681-2.
Jul. 6, 2010 Proposed Examiner's Amendment for U.S. Appl. No. 11/525,363.
Aug. 3, 2010 Notice of Abandonment for U.S. Appl. No. 11/527,797.
Jul. 28, 2010 Response to Office Action for U.S. Appl. No. 11/634,020.
Jul. 6, 2010 Nonfinal rejection for U.S. Appl. No. 11/880,840.
Jul. 21, 2010 Final Office Action for U.S. Appl. No. 11/880,686.
Aug. 18, 2008 Final Rejection for U.S. Appl. No. 11/880,852.
Jun. 30, 2010 Nonfinal Rejection for U.S. Appl. No. 11/881,064.
Aug. 20, 2010 Restrict Requirement for U.S. Appl. No. 11/881,789.
Jun. 29, 2010 Nonfinal Rejection for U.S. Appl. No. 11/881,788.
Young, Lee, W., International Search Report Aug. 7, 2007, 5 pages.
Australian Patent Office Written Opinion & Search Report, mailed Dec. 1, 2008.
Austrian Patent Office Written Opinion & Search Report, mailed Jan. 9, 2009.
Austrian Patent Office Written Opinion & Search Report, mailed Feb. 13, 2009.
Jul. 23, 2009 Notice of Allowance and Examiner's Amendment for U.S. Appl. No. 11/345,420.
Phlx Allows Floor Broker Crossing, Wall Street Letter, New York, Feb. 24, 2003, p. 1.
Anonymous, Rising tide lifts all boats in institutional equities, The Investment Dealers' digest: IDD, New York, Mar. 28, 1994, vol, 60, Iss. 13, p. 16, 5 pages.
Jun. 11, 2009 Nonfinal Rejection for U.S. Appl. No. 11/880,686.
International Search Report, Sep. 29, 2009 for SG2007166812.
International Search Report, Sep. 22, 2009 for SG2007166754.
Response to Final, Oct. 13, 2009 for U.S. Appl. No. 11/416,913.
Austrian Patent Office Search Report and Written Opinion, mailed Mar. 6, 2009.
Sep. 7, 2010 Notice of Allowance, for U.S. Appl. No. 11/345,420.
Aug. 31, 2010 Notice of Allowance, for U.S. Appl. No. 11/122,498.
Sep. 9, 2010 Notice of Allowance, for U.S. Appl. No. 11/122,498.
Sep. 9, 2010 Final Rejection, for U.S. Appl. No. 11/416,913.
Aug. 26, 2010 Final Rejection, for U.S. Appl. No. 11/416,943.
Sep. 9, 2010 Response to Restriction Requirement, for U.S. Appl. No. 11/881,789.
John Hintze, Direct Order Decision Polarizes Exchanges, Security Industry News, Jun. 13, 2005, Securities Data Publishing.
Peter Chapman, Special Feature: Fragmented Dealing Under Fire, Traders, May 1, 2000, Securities Data Publishing.
Oct. 14, 2010 Notice of Allowance, for U.S. Appl. No. 11/122,679.
Sep. 29, 2010 Notice of Allowance, for U.S. Appl. No. 11/122,498.
Oct. 13, 2010 Supplemental Notice of Allowability, for U.S. Appl. No. 11/122,498.
Sep. 27, 2010 Notice of Allowance, for U.S. Appl. NO. 11/416,710.
Sep. 24, 2010 Notice of Allowance, for U.S. Appl. No. 11/525,363.
Oct. 27, 2010 Notice of Allowance, for U.S. Appl. No. 11/634,020.
Jun. 11, 2009 EIC3600 Search Report, for U.S. Appl. No. 11/634,020.
Nov. 4, 2010 Response to Non-final, for U.S. Appl. No. 11/880,840.
Nov. 15, 2010 Response to Final, for U.S. Appl. No. 11/880,686.
Sep. 29, 2010 Response to Non-final, for U.S. Appl. No. 11/881,788.
Nov. 15, 2010 Notice of Allowance and Interview Summary, for U.S. Appl. No. 11/881,788.

* cited by examiner

REPRICE-TO-BLOCK ORDER

CROSS-REFERENCE TO RELATED APPLICATIONS

This application claims priority from and claims the benefit of U.S. Provisional Application No. 60/678,108, filed May 5, 2005, entitled "Reprice-to-Block Order Modifier", which is hereby incorporated by reference.

BACKGROUND

A block trade is a single large trade in excess of a specific volume and/or a specific market value. The definition of a block trade varies across different financial products. For instance, on the equities market, a block trade has traditionally been defined as a trade of 10,000 shares or more or a trade with a total market value of at least $200,000. In contrast, a block trade on the options market has traditionally been defined as a trade of 500 contracts or more, with a total market value of at least $150,000.

Many studies have been conducted on the impact of large block trades on prices in the marketplace, especially as relates to the equities market. Because block trades are perceived to indicate the trading strategies of large institutional investors, market participants often monitor block trades to determine if the market in a given issue is becoming increasingly bearish or bullish. When the price of a block trade is higher than the best offer in the market at the time, market participants typically interpret this to mean the market direction is moving upward for this issue. Similarly, when the price of a block trade is lower than the best bid at the time, market participants typically interpret this to mean the market direction is moving downward for this issue. The execution of a block trade at a price outside the quotes is deemed so important that some trading workstation systems are configured to automatically trigger an actionable alert every time a block trade executed outside the quotes is detected.

On some markets, block trades outside the quotes are allowed, but only under certain conditions. If no such exception condition exists and a block trade executes outside of the quotes, the offending market center "owes a fill" to the market center that had the better price at the time the block trade was reported to the marketplace. The "satisfaction fill" is typically executed in the following manner. The market center whose quote was traded-through ("the aggrieved market center") generally sends an electronic message (or satisfaction order) to the market center that traded-through the quotes ("the offending market center") requesting satisfaction for the orders that were traded-through. When the offending market center fulfills the request for satisfaction by sending the requested number of shares (or contracts) at the block price to the aggrieved market center, the aggrieved market center then is able to adjust the trade price of the orders that were traded-through to be equal to the price of the shares (or contracts) that were part of the block trade. In this manner, the aggrieved market participants receive the price improvement they would have received had the block trade interacted with the public order book.

While this "satisfaction fill" process protects orders that were at the top of the book when the block trade executed, it does not protect orders that were lower down in the book or that had a non-displayed component, such as a reserve order. When a block trade executes at a price worse than the best bid or offer, orders lower down in the book or ones that have a non-displayed component become subject to potential arbitrage. With respect to orders that were not at the top of the book and were not protected, other market participants, seeing these orders, may attempt to promptly execute against these orders and then turn around and trade such instruments on another market center to benefit from the spread created between the price the order was posted at and what may be perceived as the market's more 'informed' price, as indicated by the price of the executed block trade. Order types with a non-displayed component, such as reserve orders, are targets for possible arbitrage whether they are at the top of the book or not. Only the displayed portion of a reserve order at the top of the book is eligible for satisfaction at the block trade price. Whenever the displayed portion is depleted by trading, it is replenished at its original price, which is superior to the block trade price. Other market participants will typically attempt to execute against the reserve order at its superior price until it moves away or is depleted.

Accordingly, there is a need for a posted limit order that will reprice itself less aggressively in view of a block trade executing in that issue at a trade price that is inferior to the prices quoted on the posting market center.

SUMMARY

According to an aspect of the present invention, a method for repricing a posted limit order on a posting market center in view of a block trade executed on an away market center at an inferior price includes posting a limit order on a posting market center, receiving data regarding a block trade executed on an away market center, determining that the block trade executed at an inferior price to the limit order posted on the posting market center and automatically repricing the limit order posted on the posting market center to the inferior price that the block trade executed at. The posted limit order may be a buy order or a sell order. The posted limit order may also be a reserve order. The posting market center may operate in an equities marketplace, an options marketplace or any other financial instrument marketplace.

DESCRIPTION OF THE DRAWINGS

These and other features, aspects and advantages of the present invention will become better understood with regard to the following description, appended claims and accompanying drawings where:

DETAILED DESCRIPTION

Figure 1:
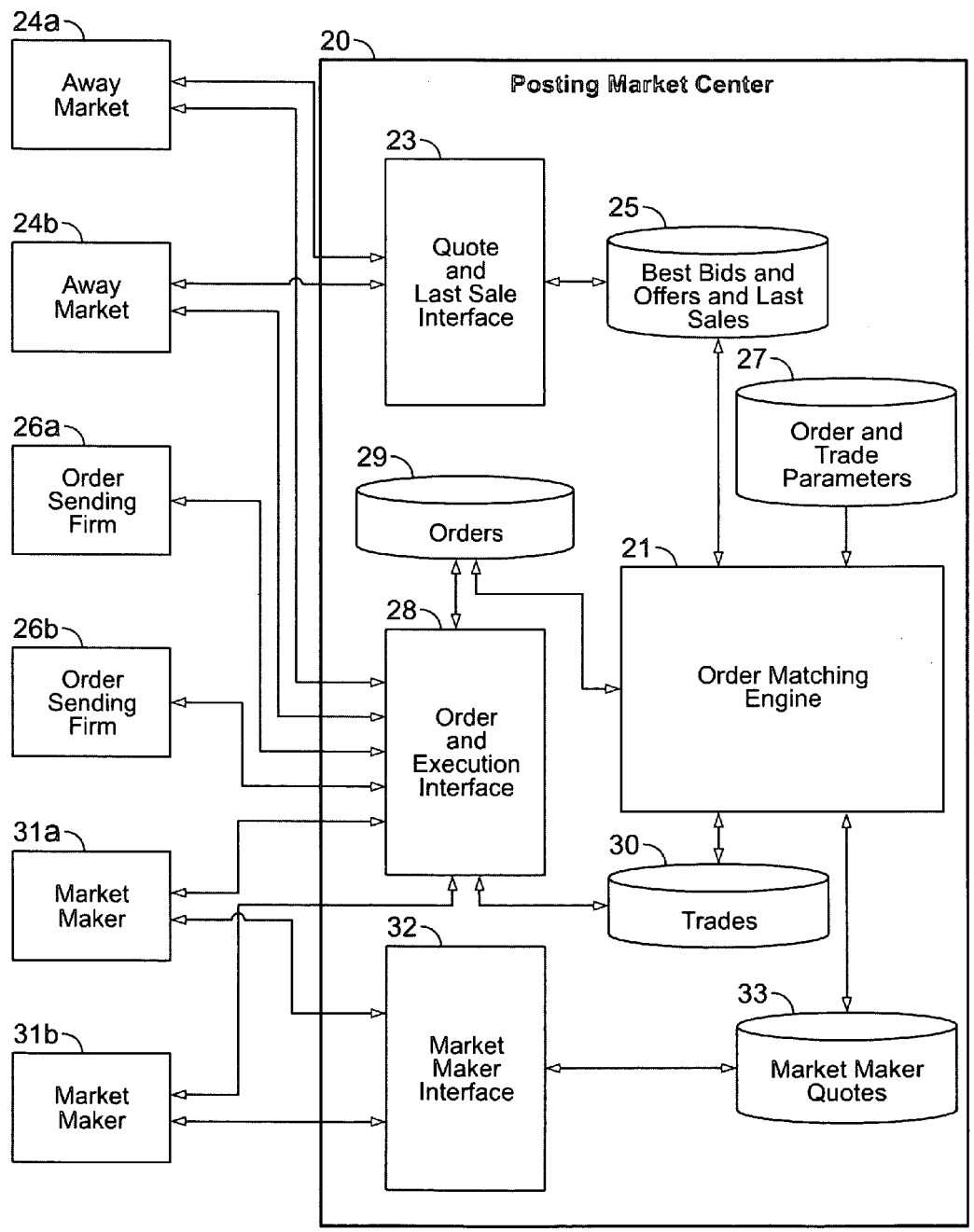
FIG. 1 is a block diagram illustrating the trading environment in which an embodiment of the present invention operates.

Referring to FIG. 1, a trading environment in which an embodiment of the system and method of the present invention operates is depicted. The examples discussed herein describe the use and application of the present invention in an equity security market center environment, but it should be understood that the present invention could be used in any type of financial instrument market center environment (e.g., securities, futures, options, bonds, etc.). The trading environment of this embodiment includes a posting market center 20 which interacts with a number of other market centers 24 (i.e. away markets), traders at order sending firms 26, and Market Makers 31. It should be understood that the trading environment of this embodiment supports, but does not require Market Makers 31, a Market Maker Interface 32, or Market Maker Quotes 33. It should also be understood that the posting market center 20 referred to herein refers to a computing system having sufficient processing and memory capabilities and does not refer to a specific physical location. In fact, in certain embodiments, the computing system may be distributed over several physical locations. It should also be understood that any number of traders 26, Market Makers 31 or away market centers 24 can interact with the posting market center 20. The posting market center 20 is the market center on which a specific trader 26 posts a specific order, and on which a specific Market Maker 31 posts a specific quote. The posting market center 20 includes an order matching engine 21, which validates, matches and processes all orders on the posting market center 20. In this embodiment, the code for the order matching engine 21 is stored in the posting market center's memory.

The posting market center 20 may also include a quote and last sale interface 23 that interacts with the away market centers 24 to capture quote and last sale information. This information is stored to a best bids and offers and last sales data structure 25. This data structure 25 is where the market best bid and offer information is stored. This data structure 25 is also where the market trade reports (prints) are stored. The posting market center 20 may also include an order and trade parameters data structure 27. The order and trade parameters data structure 27 stores pre-defined trading parameters and rules that are used by the order matching engine 21 in matching orders and executing trades. The posting market center 20 may also include an order and execution interface 28 which interacts with the traders 26, the Market Makers 31, the away market centers 24 and the order matching engine 21 in the order execution process. The posting market center 20 may also include an order information data structure 29 where order information is stored and a trade information data structure 30 where completed trade information is stored. The posting market center 20 may also include a Market Maker interface 32 that interacts with Market Makers 31 to capture Market Maker bids and offers in assigned issues. These bids and offers are logically depicted in a Market Maker Quotes structure 33 in this illustration. In actuality, the Market Maker bids and offers may physically reside in the away market center best bids and offers data structure 25.

Throughout the discussion herein, it should be understood that the details regarding the operating environment, data structures, and other technological elements surrounding the posting market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Incoming Reprice-to-Block Buy Order

Figure 2:
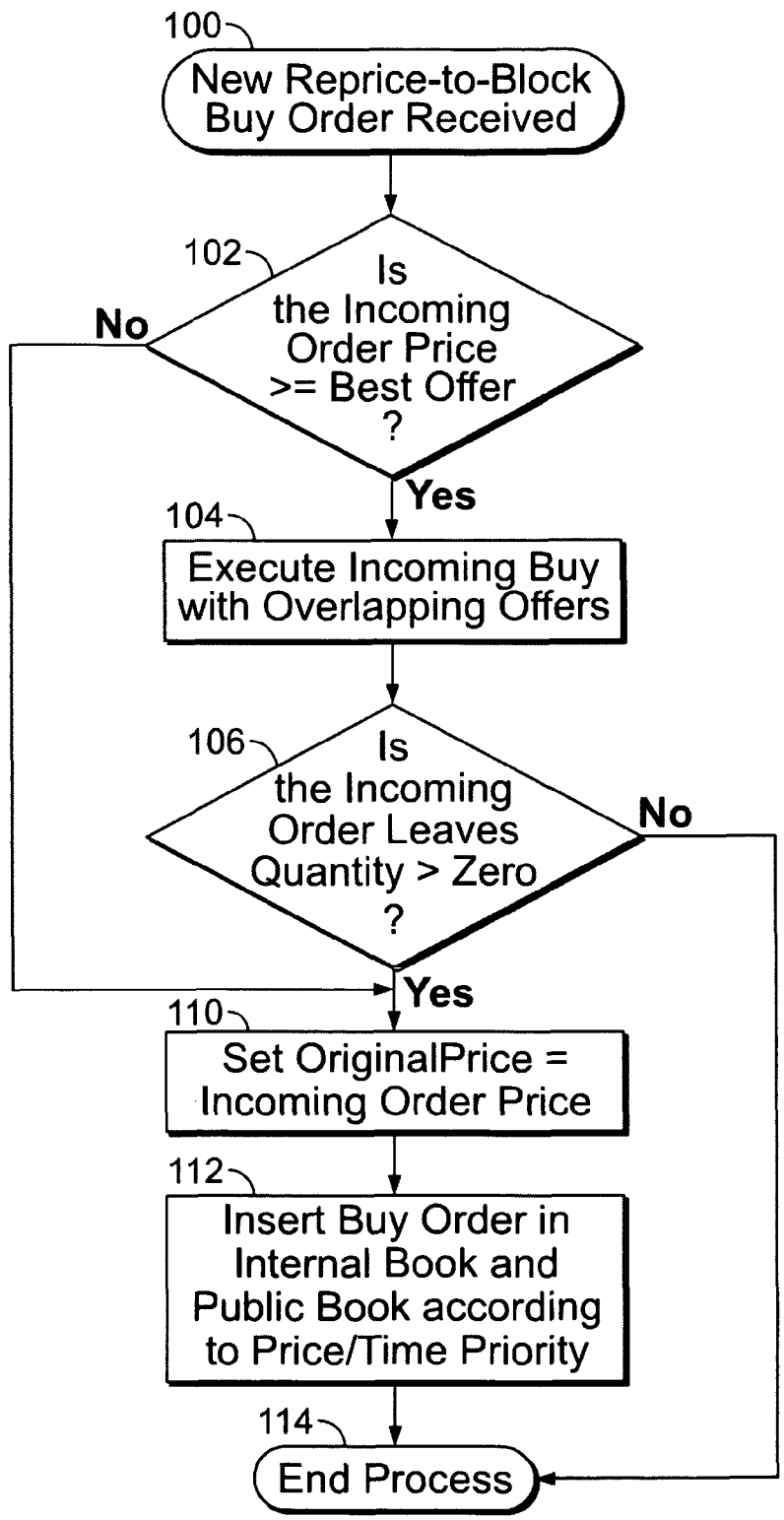
FIG. 2 is a flow diagram illustrating a process implemented by an embodiment of the present invention for tagging an incoming reprice-to-block buy order.

FIG. 2 illustrates the process implemented where a trader 26 sends a buy order to the posting market center 20 with instructions that the buy order be repriced to match the price of any block trade executed at an inferior price (i.e. a reprice-to-block order). At step 100, a new reprice-to-block buy order is received by the order matching engine 21, and the order matching engine 21, recognizing the incoming order processing request, initiates the process which tags the order as a reprice-to-block order. In this embodiment, the process tags a reprice-to-block buy order by setting the reprice-to-block field in the order data structure to "Y". In this embodiment, a reprice-to-block tag can be attached to any limit order that is displayed in the order book. This tag is especially appropriate to orders having reserve shares (or contracts). For such orders, the reprice-to-block tag applies to all shares (or contracts) in the order, both disclosed and in reserve. However, a reprice-to-block tag is not used with orders that are automatically repriced by other market indicators, such as the best bid or best offer.

At step 102, the process checks to see if the buy order is marketable against the best offers in the marketplace. It should be understood that reprice-to-block orders trade like any other limit order, and trade against the marketplace accordingly. If the buy order is marketable, the process proceeds to step 104 where the order matching engine 21 trades the new buy order against sell orders posted in the posting market center's order book and/or routes to superior away market quotes according to the market center's trading rules. Then, at step 106, the process checks to see if the buy order still has any quantity remaining on the order to be traded. If the buy order does not, then the order is complete, and the process ends with respect to this order, as indicated at step 114. If the order is not complete and still has quantity remaining to be traded, the process proceeds to step 110. Referring back to step 102, if the incoming buy order is not marketable, the process proceeds to step 110 at this point as well.

At step 110, the process sets the "OriginalPrice" parameter equal to the price set in the incoming reprice-to-block buy order. The "OriginalPrice" parameter retains the original order price for later audit purposes. Next, at step 112, the order is inserted into the posting market center's virtual consolidated electronic order and quote book ("internal book") and displayed on the public order book according to the price/time priority rules. The process terminates at step 114.

Detection of New Last Sale and Repricing of Posted Reprice-to-Block Buy Order in Response to a Block Trade at an Inferior Price With the tagged reprice-to-block order posted to the order book, the process, in this embodiment, continuously polls the last sale prices from the market-wide "Tape." The "Tape" refers to the facility that disseminates continuous trade information for a given symbol to the entire marketplace. For example, trades in exchange-listed securities are reported to the Consolidated Tape, trades in Nasdaq-listed securities are reported to the UTP Trade Data Feed and trades in options are reported to the Options Price Reporting Authority. In this document, the term "Tape" is not limited to these facilities, and may include additional facilities that disseminate last sale information for other issues.

In this embodiment, the process instituted by the order matching engine 21 reads all trades printed on the away markets for various reasons, including, most pertinent to this invention, the need to determine if the away market trade printed at a price outside the posting market center best bid or offer, and if so, if the trade was a block trade. In this embodiment, if the process detects a block trade outside the posting market center's best bid or offer, the process checks the posting market center's order book to determine if any posted orders in the traded symbol carry a reprice-to-block tag.

Figure 3:
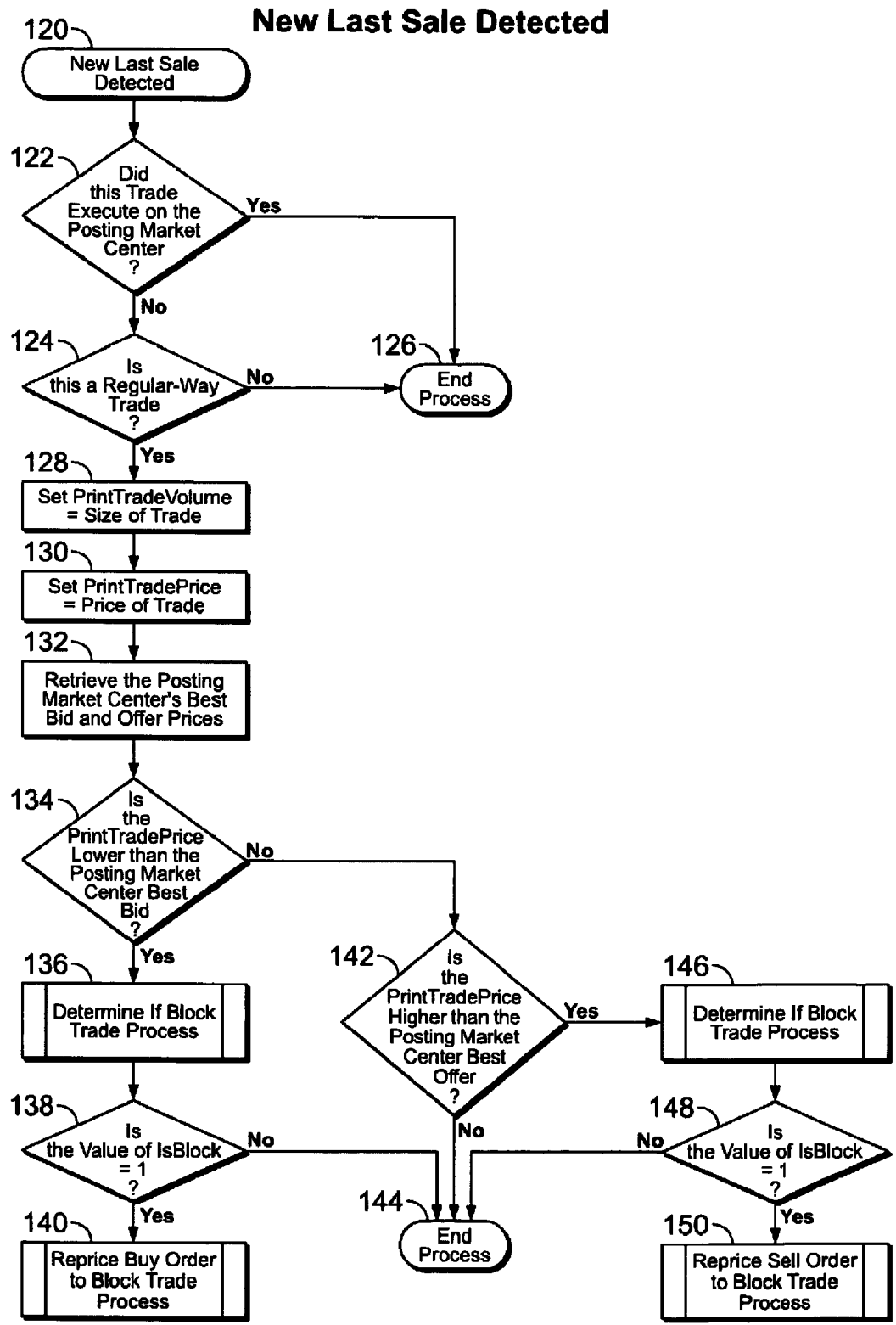
FIG. 3 is a flow diagram illustrating a process implemented by an embodiment of the present invention to detect and analyze last sale market data.

Specifically, referring to FIG. 3, the process at step 120 detects a new last sale on the Tape. At step 122, the process determines whether the trade executed on the posting market center 20. If it did, then the process ends, as indicated at step 126. If the trade did not execute on the posting market center 20, the process proceeds to step 124 where it determines whether the trade was a regular-way trade. A regular-way trade is a trade without any stated conditions attached. Reprice-to-block orders are not re-priced if the trade is not a regular-way trade because such block trades are typically not indicative of current conditions in the marketplace. Examples of trades that are not regular-way trades because they have conditions attached are trades that are reported late after other prints have occurred (e.g., sold sales), trades that occur outside of normal market hours (e.g., opening and closing trades, prior day trades, next day trades) or trades that have special delivery or sale conditions attached. The preceding types of trades do not cause reprice-to-block orders to be repriced.

If the process determines that the trade was not a regular-way trade, the process ends as indicated at 126. If the process determines that the trade was a regular-way trade, the process proceeds to step 128 where the "PrintTradeVolume" parameter is set equal to the size of the trade. The process then proceeds to step 130 where it sets the "PrintTradePrice" parameter equal to the price of the trade.

Next, at steps 132, 134 and 142, the process retrieves the posting market center's best bid and offer price and compares these prices to the stored "PrintTradePrice" value. At step 134, the process determines whether the "PrintTradePrice" parameter value is lower than the posting market center's best bid. If it is determined that the "PrintTradePrice" parameter value is lower than the posting market center's best bid, the process proceeds to step 136 where it executes a routine to determine if the trade was a block trade. If, at step 134, the process determines that the "PrintTradePrice" parameter is not lower than the best bid posted on the posting market center 20, the process proceeds to step 142. At step 142, the process determines whether the "PrintTradePrice" parameter value is higher than the posting market center's best offer. If it is determined that the "PrintTradePrice" parameter value is higher than the posting market center's best offer, the process proceeds to step 146 where it executes a routine to determine if the trade was a block trade, as it did at step 136. If, at step 142, the process determines that the "PrintTradePrice" parameter value is not higher than the posting market center's best offer, then the process ends as indicated at step 144.

At steps 138 and 148, after the block trade determination process, as explained below, has been run and if the binary value of the "IsBlock" parameter equals "1" (true), meaning the trade was a block trade, then the process proceeds to implement processes for repricing either the applicable buy order (step 140) or applicable sell order (step 150) in view of the executed block trade.

Figure 4:
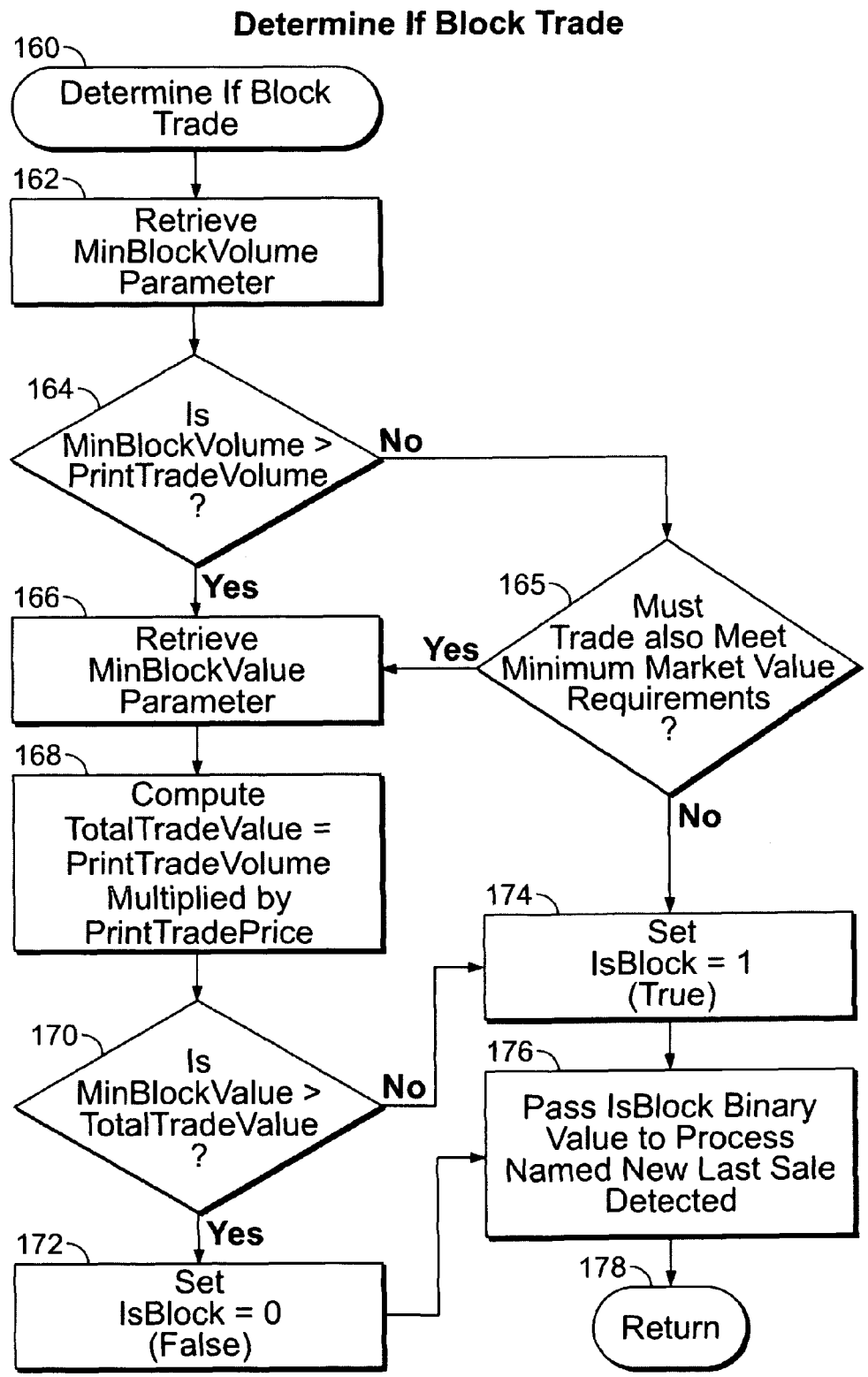
FIG. 4 is a flow diagram illustrating a process implemented by an embodiment of the present invention to determine if a trade was a block trade.

Referring to FIG. 4, the block trade determination process 160, referred to at steps 136 and 146 above, executes as follows in this embodiment. At step 162, the process retrieves the "MinBlockVolume" parameter which is set to the minimum number of shares (or contracts) that the trade must include to be considered a block trade. At step 164, the process determines whether the "MinBlockVolume" parameter is greater than the "PrintTradeVolume" parameter value. In this embodiment, if the "MinBlockVolume" parameter is not greater than the "PrintTradeVolume" parameter, the trade has to be further analyzed to determine if it is a block trade or not, according to applicable market rules. The process, then, at this point, proceeds to step 165, where the process determines whether the trade must also meet a minimum value requirement, in addition to meeting a minimum volume requirement, to be considered a block trade, according to applicable market rules. For instance, the options market defines a block trade as a trade that meets a minimum volume requirement and a minimum marketplace value requirement. Referring back to step 164 again, if the process, on the other hand, determines that the "MinBlockVolume" parameter is greater than the "PrintTradeVolume" parameter, the trade does not meet the volume definition of a block trade. However, that does not mean it is definitely not a block trade because it still might satisfy the trade value criteria for a block trade, which is analyzed starting at step 166. Specifically, the equities marketplace requires that for a trade to be considered a block trade, it must meet either a minimum volume requirement or a minimum marketplace value requirement. This is in contrast to the options marketplace explained above, which requires both criteria to be satisfied.

Referring again to step 165, if the process determines that the trade does not need to meet a minimum value requirement, in addition to meeting a minimum volume requirement, to be considered a block trade (as in the equities market), then the trade is a block trade and the parameter "IsBlock" in this example is set to "1" or true, as indicated at 174. If on the other hand, the trade must also meet a minimum market value requirement, such as in the options market, the process proceeds to step 166.

At step 166, the process retrieves the "MinBlockValue" parameter which is set to the minimum monetary value that the trade must execute at to be considered a block trade. At step 168, the process computes the value of the reported trade and stores it as the "TotalTradeValue" parameter. The "TotalTradeValue" parameter is equal to the volume of the print trade (i.e. "PrintTradeVolume") multiplied by the price of the print trade (i.e. "PrintTradePrice"). The process then, at step 170, determines whether the "MinBlockValue" parameter is greater than the "TotalTradeValue" parameter. In this embodiment, if the "MinBlockValue" parameter is not greater than the "TotalTradeValue" parameter, the trade is a block trade, and the parameter "IsBlock" is set to "1" or true, as indicated at 174. If the "MinBlockValue" parameter is greater than the "TotalTradeValue" parameter, then the print trade is not a block trade and the "IsBlock" parameter is set to "0" or false, as indicated at 172. As indicated at steps 176 and 178, the value of the "IsBlock" parameter is passed to the process at steps 138 and 148 (FIG. 3).

Referring back to FIG. 3, at steps 138 and 148, the process determines if the "IsBlock" parameter equals "1". If the "IsBlock" does not equal "1", the process ends as indicated at 144. If the "IsBlock" parameter does equal "1", the routine for repricing either a posted buy order (step 140) or a posted sell order (step 150) is initiated.

Figure 5:
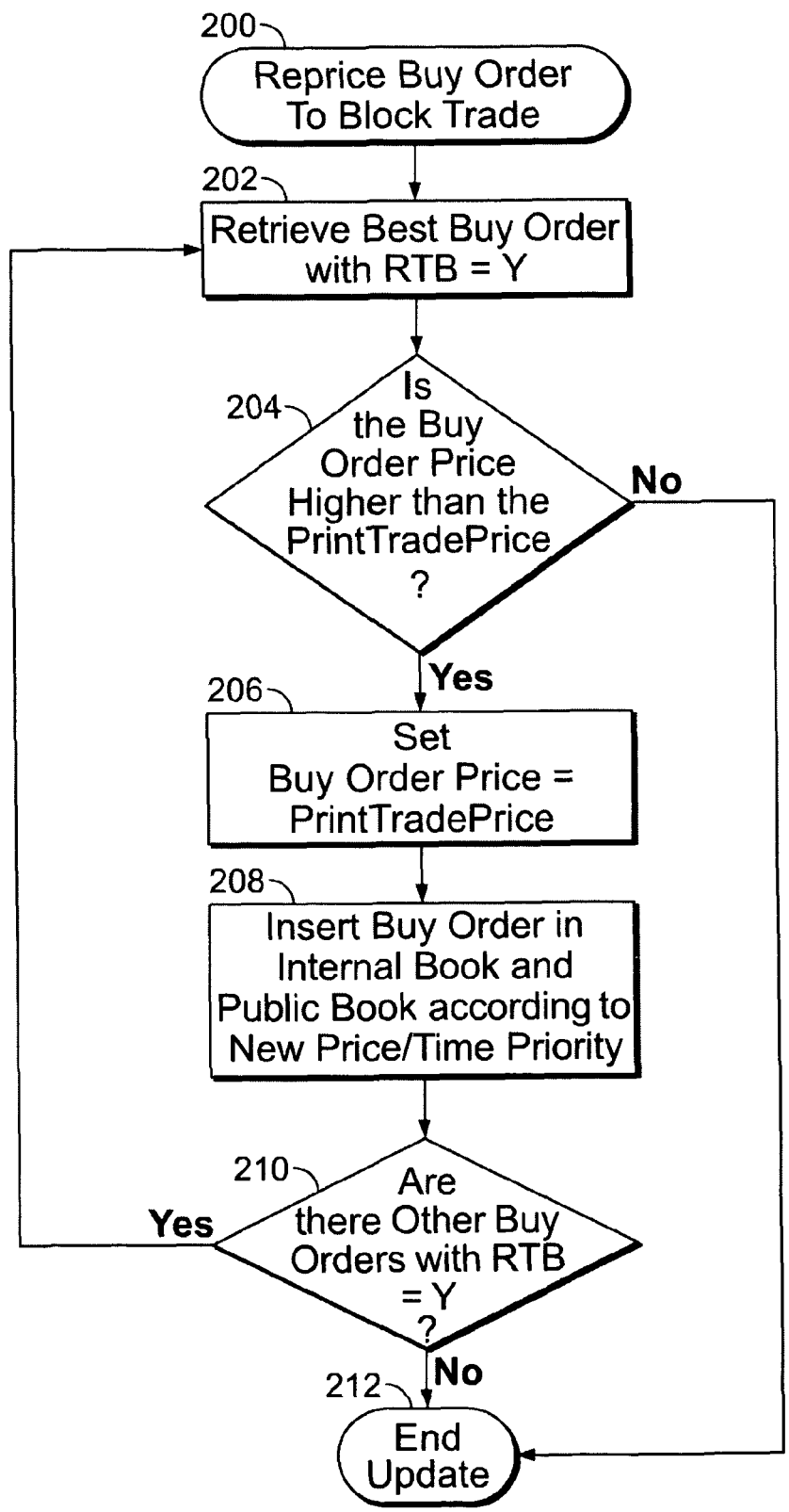
FIG. 5 is a flow diagram illustrating a process implemented by an embodiment of the present invention to reprice a posted buy order to an executed block trade price.

Referring to FIG. 5, the process to reprice a posted buy order to the block trade price is illustrated at step 200. At step 202, the process retrieves a buy order with a reprice-to-block buy order tag set to "Y". At step 204, the process then determines whether the retrieved buy order price is higher than the "PrintTradePrice" parameter. If it is, the process reprices the buy order and sets the buy order price equal to the "PrintTradePrice" parameter value and then inserts the repriced buy order into the posting market center's internal order book and the public order book according to its new price/time priority, as indicated at steps 206 and 208. The process then proceeds to determine if there are any further buy orders tagged to be repriced at step 210. At step 210, if the process determines that there are further buy orders tagged to be repriced, the process returns to step 202 to repeat the posted buy order repricing process over again. If there are no further buy orders tagged to be repriced, the process terminates as indicated at step 212. The process also proceeds to step 212 if the buy order retrieved and checked at steps 202 and 204 does not have a price that is higher than the "PrintTradePrice" value.

Incoming Reprice-to-Block Sell Order

Figure 6:
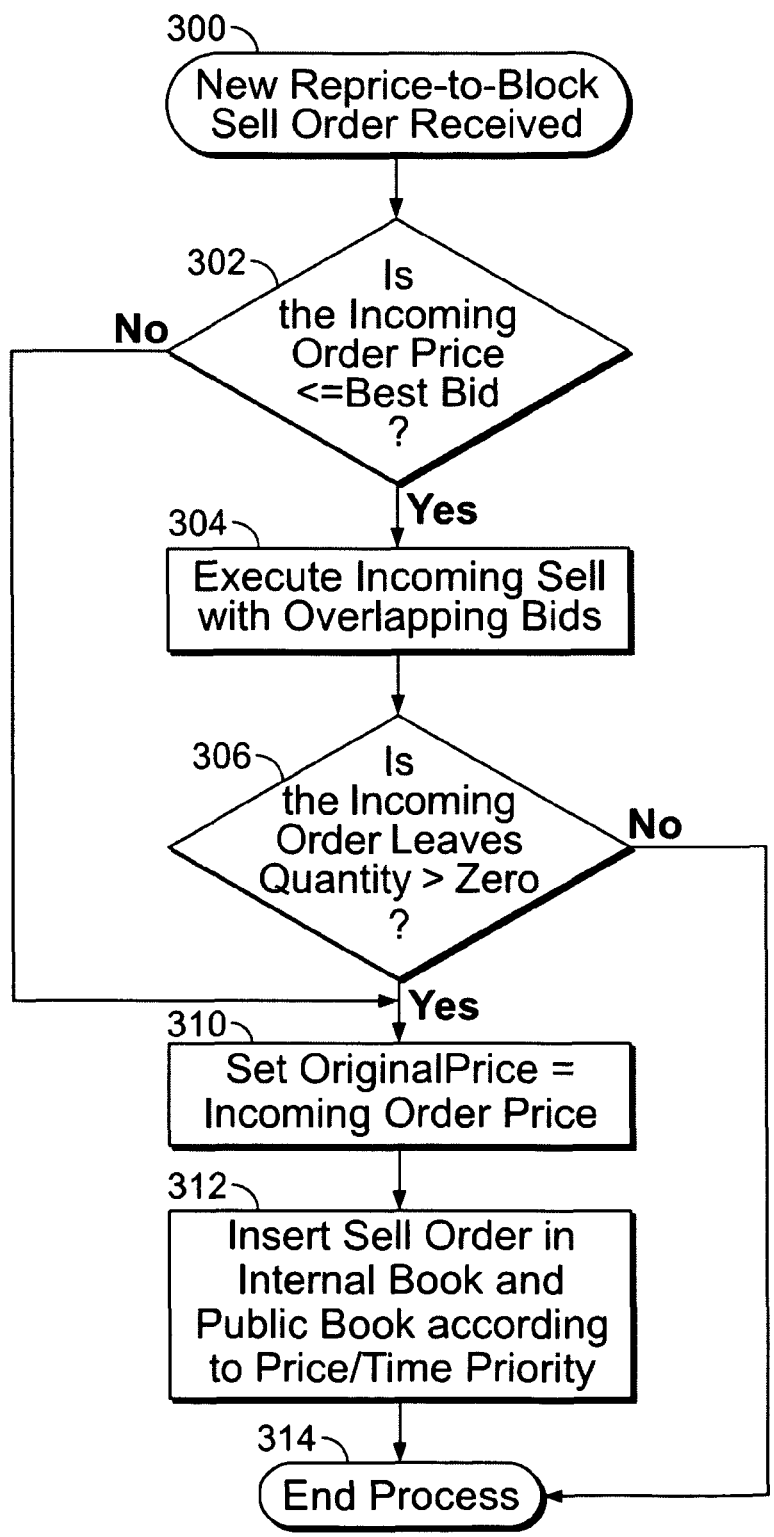
FIG. 6 is a flow diagram illustrating a process implemented by an embodiment of the present invention for tagging an incoming reprice-to-block sell order.

Referring to FIG. 6, the process for tagging and handling an incoming reprice-to-block sell order is very similar to the process described above for reprice-to-block buy orders. At step 300, a new reprice-to-block sell order is received by the order matching engine 21, and the order matching engine 21, recognizing the incoming order processing request, initiates the process which tags the order as a reprice-to-block order. As with the reprice-to-block buy orders described above, the process tags a reprice-to-block sell order by setting the reprice-to-block field in the order data structure to "Y". At step 302, the process checks to see if the sell order is marketable against the best bids in the marketplace. If the sell order is marketable, the process proceeds to step 304 where it trades the new sell order against buy orders posted in the posting market center's order book and/or routes to superior away market quotes according to the market center's trading rules. Then, at step 306, the process checks to see if the sell order still has any quantity remaining on the order to be traded. If the sell order does not, then the order is complete, and the process ends with respect to this order, as indicated at step 314. If the order is not complete and still has quantity remaining to be traded, the process proceeds to step 310. Referring back to step 302, if the incoming sell order is not marketable, the process proceeds to step 310 at this point as well.

At step 310, the process sets the "OriginalPrice" parameter equal to the price set in the incoming reprice-to-block sell order. Next, at step 312, the order is inserted into the posting market center's internal order book and displayed on the public order book according to the price/time priority rules. The process terminates at step 314.

Repricing a Reprice-to-Block Sell Order

Figure 7:
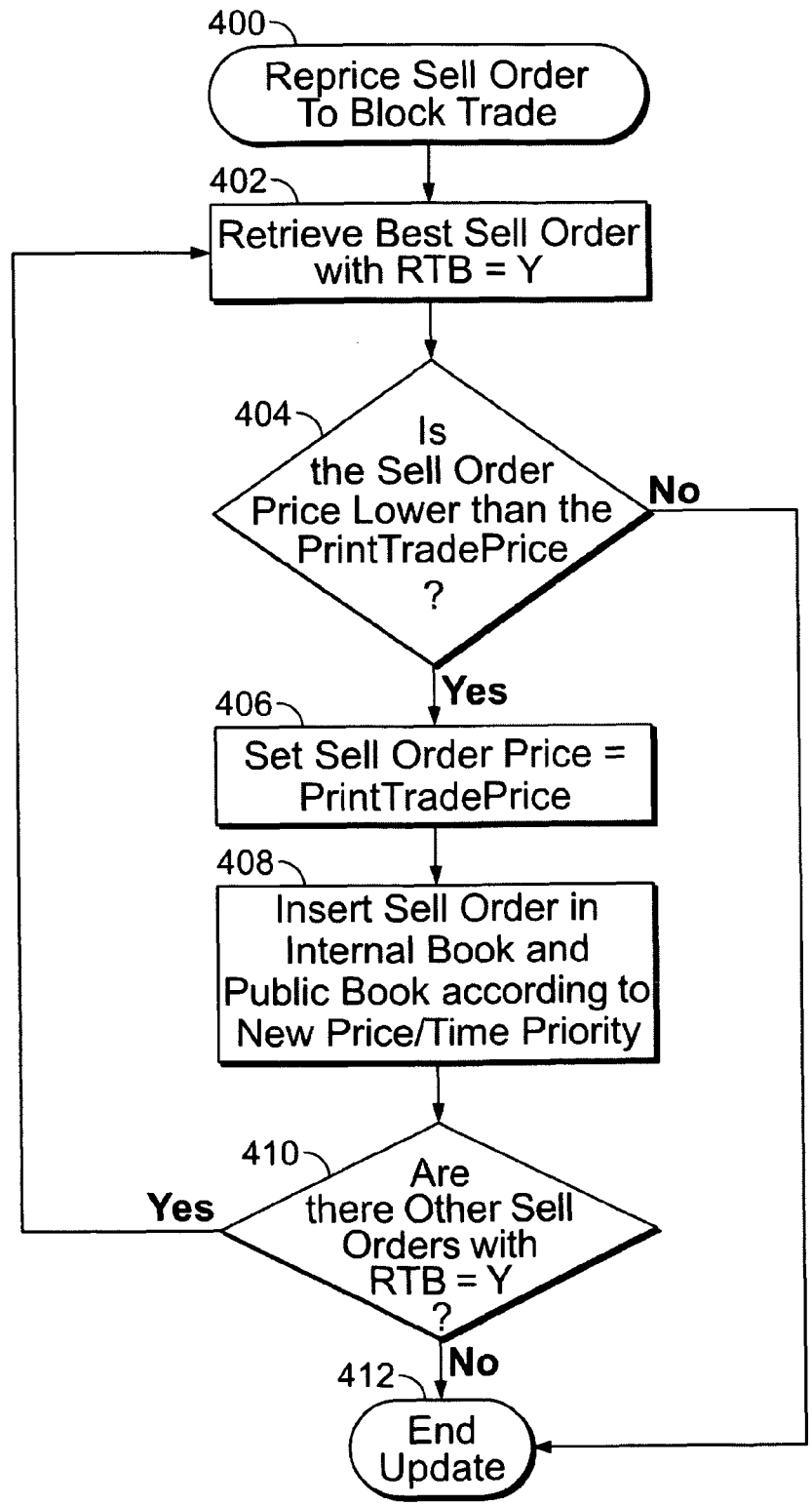
FIG. 7 is a flow diagram illustrating a process implemented by an embodiment of the present invention to reprice a posted sell order to an executed block trade price.

Referring to FIG. 7, the process to reprice a posted sell order to the block trade price is very similar to the process of repricing a reprice-to-block buy order described above and is illustrated starting at step 400. At step 402, the process retrieves a sell order with a reprice-to-block sell order tag set to "Y". At step 404, the process then determines whether the retrieved sell order price is lower than the "PrintTradePrice" parameter. If it is, the process reprices the sell order and sets the sell order price equal to the "PrintTradePrice" parameter value and then inserts the repriced sell order into the posting market center's internal order book and the public order book according to its new price/time priority, as indicated at steps 406 and 408. The process then proceeds to determine if there are any further sell orders tagged to be repriced at step 410. At step 410, if the process determines that there are further sell orders tagged to be repriced, the process returns to step 402 to repeat the posted sell order repricing process over again. If there are no further sell orders tagged to be repriced, the process terminates as indicated at step 412. The process also proceeds to step 412 if the sell order retrieved and checked at steps 402 and 404 does not have a price that is lower than the "PrintTradePrice" value.

Examples of how tagged reprice-to-block orders operate are provided below. It should be understood that the order and quote prices and sizes, as well as Print prices, discussed in these examples are by way of example only to illustrate how the process of an embodiment of the invention handles repricing a tagged order to an executed block trade price.

EXAMPLE 1

Receipt of Reprice-to-Block Buy Orders

At the start of the examples that follow, the internal order book of a posting market center appears as indicated. The issue used in this example is an equity security. The best bid and offer from an away market 24a is also shown included in the internal book in these examples. The posting market center 20 in this example is at the best bid with 11,000 at $20.02 and is also at the best offer with 5000 at $20.03. Away Market Center A is bidding 2000 at $20.00 and offering 1000 at $20.03. The internal book looks like this:

| Bids | | Offers | |
|---|---|---|---|
| Order A: | 11,000 @ 20.02 | Order C: | 5000 @ 20.03 |
| Order B: | 3000 @ 20.01, | Away Market Center A | 1000 @ 20.03 |
| Reserve size = 2000 | | | |
| Away Market Center A | 2000 @ 20.00 | Order D: | 1000 @ 20.05 |

The public posting market center book looks like this:

| Bids | | Offers | |
|---|---|---|---|
| Posting Market Center | 11,000 @ 20.02 | Posting Market Center | 5000 @ 20.03 |
| Posting Market Center | 3000 @ 20.01 | Posting Market Center | 1000 @ 20.05 |

At step 100, the process receives the following incoming reprice-to-block buy order:
→Order E: Buy 5000 @ 20.02, Show size=400, Reserve size=4600, RTB=Yes At step 102, the process determines that Order E is not marketable, as there is no overlap between the buy order price and the best offer price. At step 110, it stores the order price as the OriginalPrice for audit purposes, and at step 112, it posts the reprice-to-block order to the internal book and public posting market center book according to normal price/time priority rules. The process terminates at step 114.

The internal book looks like this:

| Bids | | Offers | |
|---|---|---|---|
| Order A: | 11,000 @ 20.02 | Order C: | 5000 @ 20.03 |
| Order E: | 400 @ 20.02, ← | Away Market Center A | 1000 @ 20.03 |
| Reserve size = 4600, OriginalPrice = 20.02, RTB = Y | | | |
| Order B: | 3000 @ 20.01, | Order D: | 1000 @ 20.05 |
| Reserve size = 2000 | | | |
| Away Market Center A | 2000 @ 20.00 | | |

The public posting market center book looks like this:

| Bids | | Offers | |
|---|---|---|---|
| Posting Market Center | 11,400 @ 20.02 | Posting Market Center | 5000 @ 20.03 |
| Posting Market Center | 3000 @ 20.01 | Posting Market Center | 1000 @ 20.05 |

In this example, the posting market center 20 receives the following reprice-to-block buy order at step 100:
→Order F: Buy 2000 @ 20.01, Show size=900, Reserve size=1100, RTB=Yes At step 102, the process determines that Order F is not marketable, as there is no overlap between the buy order price and the best offer price. At step 110, it stores the order price as the OriginalPrice for audit purposes, and in step 112 it posts the reprice-to-block order to the internal book and the public posting market center order book according to normal price/time priority rules. The process terminates at step 114.

The internal book looks like this:

| Bids | | Offers | |
|---|---|---|---|
| Order A: | 11,000 @ 20.02 | Order C: | 5000 @ 20.03 |
| Order E: | 400 @ 20.02, Reserve size = 4600, OriginalPrice = 20.02, RTB = Y | Away Market Center A | 1000 @ 20.03 |
| Order B: | 3000 @ 20.01, Reserve size = 2000 | Order D: | 1000 @ 20.05 |
| Order F: | 900 @ 20.01, ← Reserve size = 1100, OriginalPrice = 20.01, RTB = Y | | |
| Away Market Center A | 2000 @ 20.00 | | |

The public posting market center order book looks like this:

| Bids | | Offers | |
|---|---|---|---|
| Posting Market Center | 11,400 @ 20.02 | Posting Market Center | 5000 @ 20.03 |
| Posting Market Center | 3900 @ 20.01 ← | Posting Market Center | 1000 @ 20.05 |

EXAMPLE 2

Block Trade on the Tape is not at an Inferior Price

At step 120, the process detects the following Print (Last Sale) on the Tape:
→10,000 shares @ 20.02 traded on Away Market A At step 122, the process determines that this trade did not execute on the posting market center 20 (i.e. it is an away market execution), and at step 124, the process determines that this is a regular-way trade. As such, at step 128, the process sets the "PrintTradeVolume" parameter equal to 10,000, the size of the trade. At step 130, the process sets the "PrintTradePrice" parameter equal to $20.02, the price of the trade.

Then, at step 132, the process retrieves the posting market center's best bid and offer and at step 134, the process compares the PrintTradePrice parameter ($20.02) to the posting market center best bid ($20.02). As the PrintTradePrice parameter is not lower than the posting market center best bid, the process does not need to check for the presence of any reprice-to-block buy orders. The process continues to step 142 accordingly.

At step 142, the process compares the PrintTradePrice parameter ($20.02) to the posting market center's best offer ($20.03). As the PrintTradePrice parameter is not higher than the posting market center's best offer, the process does not need to check for the presence of any reprice-to-block sell orders. For this last sale price, the process is complete, as indicated at step 144.

EXAMPLE 3

Trade on the Tape is an Inferior Price, But is not a Block Trade

The internal book still looks like this:

| Bids | | Offers | |
|---|---|---|---|
| Order A: | 11,000 @ 20.02 | Order C: | 5000 @ 20.03 |
| Order E: | 400 @ 20.02, Reserve size = 4600, OriginalPrice = 20.02, RTB = Y | Away Market Center A | 1000 @ 20.03 |
| Order B: | 3000 @ 20.01, Reserve size = 2000 | Order D: | 1000 @ 20.05 |
| Order F: | 900 @ 20.01, Reserve size = 1100, OriginalPrice = 20.01, RTB = Y | | |
| Away Market Center A | 2000 @ 20.00 | | |

At step 120, the process detects the following Print on the Tape:
→9,500 shares @ 20.01 traded on Away Market A At step 122, the process determines that this trade did not execute on the posting market center, and at step 124, the process determines that this is a regular-way trade. At step 128, the process sets the PrintTradeVolume parameter equal to 9,500, the size of the trade. At step 130, the process sets the PrintTradePrice parameter equal to $20.01, the price of the trade.

At step 132, the process retrieves the posting market center's best bid and offer, and at step 134, the process compares the PrintTradePrice parameter ($20.01) to the posting market center's best bid ($20.02). As the PrintTradePrice parameter is lower than the posting market center best bid, the process continues to step 136 and initiates the process to determine if the Last Sale constitutes a block trade at step 160 (FIG. 4).

At step 162, the process retrieves the MinBlockVolume parameter, which, in this example, is presently set to 10,000 shares. At step 164, the process compares the PrintTradeVolume parameter (9,500) to the MinBlockVolume parameter (10,000). As the PrintTradeVolume is less than the MinBlockVolume, the process continues to step 166. At step 166, the process retrieves the MinBlockValue parameter, which is presently set to $200,000.

At step 168, the process computes the TotalTradeValue parameter by multiplying the PrintTradeVolume parameter (9,500) by the PrintTradePrice parameter ($20.01). The derived TotalTradeValue=$190,095. At step 170, the process compares the TotalTradeValue ($190,095) to the MinBlockValue ($200,000). As the TotalTradeValue is less than the MinBlockValue, the process determines that this trade does not constitute a block trade. At step 172, the flag "IsBlock" is set to "0" (false).

At step 176, the process passes the binary value back to step 138 in the process New Last Sale Detected (FIG. 3). As the value of IsBlock=0, no reprice-to-block orders are repriced, and the process ends at step 144 with respect to this last sale.

EXAMPLE 4

Trade on the Tape is not an Away Market Execution

The internal book still looks like this:

| Bids | | Offers | |
|---|---|---|---|
| Order A: | 11,000 @ 20.02 | Order C: | 5000 @ 20.03 |
| Order E: | 400 @ 20.02, | Away Market Center A | 1000 @ 20.03 |
| Reserve size = 4600, OriginalPrice = 20.02, RTB = Y | | | |
| Order B: | 3000 @ 20.01, | Order D: | 1000 @ 20.05 |
| Reserve size = 2000 | | | |
| Order F: | 900 @ 20.01, | | |
| Reserve size = 1100, OriginalPrice = 20.01, RTB = Y | | | |
| Away Market Center A | 2000 @ 20.00 | | |

The process receives the following limit order:
→Order G: Sell 10,000 @ 20.02

The process matches incoming Order G with 10,000 shares of posted Order A according to normal trading rules, depleting all of Order G and leaving 1,000 shares of Order A posted to the book.

The internal book looks like this:

| Bids | | Offers | |
|---|---|---|---|
| Order A: | 1000 @ 20.02 ← | Order C: | 5000 @ 20.03 |
| Order E: | 400 @ 20.02, | Away Market Center A | 1000 @ 20.03 |
| Reserve size = 4600, OriginalPrice = 20.02, RTB = Y | | | |
| Order B: | 3000 @ 20.01, | Order D: | 1000 @ 20.05 |
| Reserve size = 2000 | | | |

-continued

| Bids | | Offers | |
|---|---|---|---|
| Order F: | 900 @ 20.01, | | |
| Reserve size = 1100, OriginalPrice = 20.01, RTB = Y | | | |
| Away Market Center A | 2000 @ 20.00 | | |

The public posting market center order book looks like this:

| Bids | | Offers | |
|---|---|---|---|
| Posting Market Center | 1400 @ 20.02 ← | Posting Market Center | 5000 @ 20.03 |
| Posting Market Center | 3900 @ 20.01 | Posting Market Center | 1000 @ 20.05 |

A few seconds later, at step 120, the process detects the resulting Print on the Tape:
→10,000 shares @ 20.02 traded on the Posting Market Center At step 122, the process determines that this trade executed on the posting market center 20, so it ends the process at step 126. Only away market trades can reprice reprice-to-block orders.

EXAMPLE 5

Trade on the Tape is an Inferior Priced Block Trade, Reprice-to-Block Buy Orders are Repriced In this example, the internal book still appear as follows:

| Bids | | Offers | |
|---|---|---|---|
| Order A: | 1000 @ 20.02 | Order C: | 5000 @ 20.03 |
| Order E: | 400 @ 20.02, | Away Market Center A | 1000 @ 20.03 |
| Reserve size = 4600, OriginalPrice = 20.02, RTB = Y | | | |
| Order B: | 3000 @ 20.01, | Order D: | 1000 @ 20.05 |
| Reserve size = 2000 | | | |
| Order F: | 900 @ 20.01, | | |
| Reserve size = 1100, OriginalPrice = 20.01, RTB = Y | | | |
| Away Market Center A | 2000 @ 20.00 | | |

At step 120, the process detects the following Print on the Tape:
→10,000 shares @ 20.00 traded on Away Market Center A At step 122, the process determines that this trade did not execute on the posting market center 20, and at step 124, the process determines that this is a regular-way trade. At step 128, the process sets the PrintTradeVolume parameter equal to 10,000, the size of the trade. At step 130, the process sets the PrintTradePrice parameter equal to $20.00, the price of the trade.

At step 132, the process retrieves the posting market center's best bid and offer, and in step 134, the process compares the PrintTradePrice parameter ($20.00) to the posting marker center best bid ($20.02). As the PrintTradePrice parameter is lower than the posting market center best bid, the process continues to step 136 and initiates the process to determine if the Last Sale constitutes a block trade, at step 160 (FIG. 4).

At step 162, the process retrieves the MinBlockVolume parameter, which, in this example, is set to 10,000 shares. At step 164, the process compares the PrintTradeVolume parameter (10,000) to the MinBlockVolume parameter (10,000). As the PrintTradeVolume is the same as the MinBlockVolume, the process proceeds to step 165 where it determines if the trade must also meet minimum marketplace value requirements. As this example uses an equity security issue as its basis and block trades are not required to meet minimum value requirements in addition to minimum volume requirements, the process proceeds from step 165 to step 174.

At step 174, the process sets the flag "IsBlock" equal to "1" (true). At step 176, the process passes the binary value back to step 138 in the process New Last Sale Detected (FIG. 3). As the value of IsBlock=1, the process proceeds to step 140 to determine whether any reprice-to-block buy orders must be repriced. Step 140 invokes the process to reprice-to-block buy orders at step 200 (FIG. 5).

At step 202, the process retrieves the first reprice-to-block buy order, Order E. At step 204, it compares the price of Order E ($20.02) to the PrintTradePrice ($20.00). As the buy order's price is higher, at step 206, the process changes Order E's price to $20.00, the price of the PrintTradePrice. At step 208, the process inserts the repriced order in the internal book according to its new price/time priority.

The internal book momentarily appears as follows after Order E has been repriced:

| Bids | | Offers | |
|---|---|---|---|
| Order A: | 1000 @ 20.02 | Order C: | 5000 @ 20.03 |
| Order B: | 3000 @ 20.01, | Away Market Center A | 1000 @ 20.03 |
| Reserve size = 2000 | | | |
| Order F: 900 @ 20.01, | | Order D: | 1000 @ 20.05 |
| Reserve size = 1100, | | | |
| OriginalPrice = 20.01, | | | |
| RTB = Y | | | |
| Order E: | 400 @ 20.00, ← | | |
| Reserve size = 4600, | | | |
| OriginalPrice = 20.02, | | | |
| RTB = Y | | | |
| Away Market Center A | 2000 @ 20.00 | | |

At step 210, the process checks to see if there are any more buy orders with RTB=Y and determines that there are. The process returns to step 202 and retrieves the next reprice-to-block order, Order F. At step 204, the process compares the price of Order F ($20.01) to the PrintTradePrice ($20.00). As the buy order's price is higher, the process changes Order F's price to $20.00, the value of the PrintTradePrice, at step 206. At step 208, the process inserts the repriced order in the internal order book according to its new price/time priority. At step 210, the process again checks to see if any more buy orders with RTB=Y exist, and finding none in this example, ends the update process at step 212.

The internal book looks like this:

| Bids | | Offers | |
|---|---|---|---|
| Order A: | 1000 @ 20.02 | Order C: | 5000 @ 20.03 |
| Order B: | 3000 @ 20.01 | Away Market Center A | 1000 @ 20.03 |
| Reserve size = 2000 | | | |
| Order E: | 400 @ 20.00, | Order D: | 1000 @ 20.05 |
| Reserve size = 4600, | | | |
| OriginalPrice = 20.02, | | | |
| RTB = Y | | | |
| Order F: | 900 @ 20.00, ← | | |
| Reserve size = 1100, | | | |
| OriginalPrice = 20.01, | | | |
| RTB = Y | | | |
| Away Market Center A | 2000 @ 20.00 | | |

The public posting market center book now looks like this:

| Bids | | Offers | |
|---|---|---|---|
| Posting Market Center | 1000 @ 20.02 ← | Posting Market Center | 5000 @ 20.03 |
| Posting Market Center | 3000 @ 20.01 ← | Posting Market Center | 1000 @ 20.05 |
| Posting Market Center | 1300 @ 20.00 ← | | |

EXAMPLE 6

Incoming Sell Order Trades with Posted Buy Orders where Reprice-to-Block Orders have Already Moved Their Prices At around the same time the above process is happening, a market participant has also detected the block trade that executed priced at $20.00, and this market participant also detected the superior-priced bids that were displayed on the posting market center prior to being repriced. As a reminder, at the time the block trade at $20.00 was reported to the Tape, the public book for the posting market center looked like this:

| Bids | | Offers | |
|---|---|---|---|
| Posting Market Center | 1400 @ 20.02 | Posting Market Center | 5000 @ 20.03 |
| Posting Market Center | 3900 @ 20.01 | Posting Market Center | 1000 @ 20.05 |

The market participant that detected the block trade at $20.00 sees that the posting market center is displaying 5300 orders superior to the block trade at $20.00 (i.e. 1400 at $20.02 and 3900 at $20.01). The market participant attempts to trade against the superior priced orders immediately.

The posting market center 20 receives the following order:
→Order H: Sell 6000 @ 20.01, IOC The process retrieves the highest buy order, Order A. It compares the price of Order A ($20.02) to the price of incoming Order H ($20.01). As the prices overlap, the process matches 1000 shares at $20.02, Order A's price, completely filling Order A and removing it from the books. The process checks to see if incoming Order H still has additional shares to trade, and determines that it has 5000 shares remaining.

The process retrieves the next buy order, Order B. It compares the price of Order B ($20.01) to the price of incoming Order H ($20.01). As the prices are equal, the process matches 5000 shares at $20.01, completely filling Order B and removing it from the books. The process first matches the 3000 displayed shares of Order B and then matches the 2000 reserve shares of Order B. The process checks to see if incoming Order H still has additional shares to trade, and determining that none remain, the process is terminated.

The internal book looks like this:

| Bids | | Offers | |
|---|---|---|---|
| Order E: Reserve size = 4600, OriginalPrice = 20.02, RTB = Y | 400 @ 20.00, | Order C: | 5000 @ 20.03 |
| Order F: Reserve size = 1100, OriginalPrice = 20.01, RTB = Y | 900 @ 20.00, | Away Market Center A | 1000 @ 20.03 |
| Away Market Center A | 2000 @ 20.00 | Order D: | 1000 @ 20.05 |

The public posting market center book now looks like this:

| Bids | | Offers | |
|---|---|---|---|
| Posting Market Center | 1300 @ 20.00 ← | Posting Market Center | 5000 @ 20.03 |
| | | Posting Market Center | 1000 @ 20.05 |

As illustrated in this example, Orders A and B left themselves open to arbitrage since they were not reprice-to-block orders. After the block trade, Orders A and B remained at their original prices. As a result, these orders, Orders A and B, were hit by an incoming order taking advantage of this arbitrage opportunity.

In contrast, Orders E and F, which were tagged to reprice, promptly repriced to the block trade price when the block trade at the inferior price was detected. As a result, the automatic repricing of these orders prevented then from being hit at their original, superior order price. Once repriced, a reprice-to-block order, such as Orders E and F in this example, do not revert to their original price. However, Orders E and F could be repriced lower. For instance, should another block trade subsequently trade at a price that is lower than their current price ($20.00), Orders E and F would be automatically repriced again, and their previous price would be stored for audit purposes as well. This process is repeated as necessary until Orders E and F are fully executed or canceled.

Away Market Center A then changes its offer price to $20.01. The internal book looks like this:

| Bids | | Offers | |
|---|---|---|---|
| Order E: Reserve size = 4600, OriginalPrice = 20.02, RTB = Y | 400 @ 20.00, | Away Market Center A | 1000 @ 20.01 ← |
| Order F: Reserve size = 1100, OriginalPrice = 20.01, RTB = Y | 900 @ 20.00, | Order C: | 5000 @ 20.03 |
| Away Market Center A | 2000 @ 20.00 | Order D: | 1000 @ 20.05 |

Market Center A's Offer of $20.01 is now the best offer. As shown in the examples that follow, reprice-to-block orders are repriced whenever a worse-priced block trade is detected, regardless of whether the posting market center 20 is at the NBBO or not.

EXAMPLE 7

Reprice-to-Block Sell Order is Received

At step 300, the process receives the following incoming reprice-to-block sell order:
→Order I: Sell 3000 @ 20.02, Show size=300, Reserve size=2700, RTB=Yes At step 302, the process determines that Order I is not marketable, as there is no overlap between the sell order price and the best bid price. (Note that even though the OriginalPrice of Order E is $20.02, the order can only trade at its current price of $20.00.) At step 310, the process stores the order price as the OriginalPrice for audit purposes, and at step 312, it posts the reprice-to-block order to the internal book and the public posting market center order book according to normal price/time priority rules. The process terminates at step 314.

The internal book looks like this:

| Bids | | Offers | |
|---|---|---|---|
| Order E: Reserve size = 4600, OriginalPrice = 20.02, RTB = Y | 400 @ 20.00, | Away Market Center A | 1000 @ 20.01 |
| Order F: Reserve size = 1100, OriginalPrice = 20.01, RTB = Y | 900 @ 20.00, | Order I: Reserve size = 2700, OriginalPrice = 20.02, RTB = Y | 300 @ 20.02, ← |
| Away Market Center A | 2000 @ 20.00 | Order C: | 5000 @ 20.03 |
| | | Order D: | 1000 @ 20.05 |

The public posting market center order book now looks like this:

| Bids | | Offers | |
|---|---|---|---|
| Posting Market Center | 1300 @ 20.00 | Posting Market Center | 300 @ 20.02 ← |
| | | Posting Market Center | 5000 @ 20.03 |
| | | Posting Market Center | 1000 @ 20.05 |

EXAMPLE 8

Block Trade on the Tape is Not at an Inferior Price

At step 120, the process detects the following Print on the Tape:
→10,000 shares @ 20.02 traded on Away Market Center A At step 122, the process determines that this trade did not execute on the posting market center 20, and at step 124, it determines that this is a regular-way trade. At step 128, the process sets the PrintTradeVolume parameter equal to 10,000, the size of the trade. At step 130, it sets the PrintTradePrice parameter equal to $20.02, the price of the trade.

At step 132, the process retrieves the posting market center best bid and offer and in step 134, it compares the PrintTradePrice ($20.02) to the posting market center best bid ($20.00). As the PrintTradePrice parameter is not lower than the posting market center best bid, the process does not need to check for the presence of any reprice-to-block buy orders, so the process continues to step 142.

At step 142, the process compares the PrintTradePrice parameter ($20.02) to the posting market center best offer ($20.02). As the PrintTradePrice parameter is not higher than the posting market center best offer (the prices are equal), the process does not need to check for the presence of any reprice-to-block sell orders. The process, in this example, is complete as indicated at step 144.

EXAMPLE 9

Trade on the Tape is an Inferior Price, But is Not a Block Trade

In step 120, the process detects the following Print on the Tape:
→9,500 shares @ 20.03 traded on Away Market Center A At step 122, the process determines that this trade did not execute on the posting market center 20, and in step 124, it determines that this is a regular-way trade. At step 128, the process sets the PrintTradeVolume parameter equal to 9,500, the size of the trade. At step 130, it sets the PrintTradePrice parameter equal to $20.03, the price of the trade.

At step 132, the process retrieves the posting market center's best bid and offer and in step 134, the process compares the PrintTradePrice parameter ($20.03) to the posting market center's best bid ($20.00). As the PrintTradePrice parameter is not lower than the posting market center's best bid, the process does not need to reprice any reprice-to-block buy orders, so the process continues to step 142. At step 142, the process compares the PrintTradePrice parameter ($20.03) to the posting market center's best offer price ($20.02) and determines that the PrintTradePrice parameter is higher. The process proceeds to step 146 and initiates the process to determine if the Last Sale constitutes a block trade at step 160 (FIG. 4).

At step 162, the process retrieves the MinBlockVolume parameter, which is currently set to 10,000 shares. At step 164, the process compares the PrintTradeVolume parameter (9,500) to the MinBlockVolume parameter (10,000). As the PrintTradeVolume parameter is less than the MinBlockVolume parameter, it proceeds to step 166.

At step 166, the process retrieves the MinBlockValue parameter, which is currently set to $200,000. At step 168, the process computes the TotalTradeValue parameter by multiplying the PrintTradeVolume (9,500) by the PrintTradePrice ($20.03). The derived TotalTradeValue=$190,285. At step 170, the process compares the TotalTradeValue ($190,285) to the MinBlockValue ($200,000). As the TotalTradeValue is less than the MinBlockValue, it determines that this trade does not constitute a block trade. At step 172, it sets the flag "IsBlock"=0 (false).

At step 176, the process passes the binary value back to step 148 in the process New Last Sale Detected (FIG. 3). As the value of "IsBlock"=0, no reprice-to-block sell orders are repriced, so the process ends at step 144.

EXAMPLE 10

Trade on the Tape is an Inferior Priced Block Trade, Reprice-to-Block Sell Orders are Repriced The internal book still looks like this:

| | Bids | | Offers | |
|---|---|---|---|---|
| Order E: Reserve size = 4600, OriginalPrice = 20.02, RTB = Y | 400 @ 20.00, | Away Market Center A | 1000 @ 20.01 | |
| Order F: Reserve size = 1100, OriginalPrice = 20.01, RTB = Y | 900 @ 20.00, | Order I: Reserve size = 2700, OriginalPrice = 20.02, RTB = Y | 300 @ 20.02, | |
| Away Market Center A | 2000 @ 20.00 | Order C: | 5000 @ 20.03 | |
| | | Order D: | 1000 @ 20.05 | |

At step 120, the process detects the following Print on the Tape:
→10,000 shares @ 20.03 traded on Away Market Center A At step 122, the process determines that this trade did not execute on the posting market center 20, and at step 124, the process determines that this is a regular-way trade. At step 128, the process sets the PrintTradeVolume parameter=10,000, the size of the trade. At step 130, it sets the PrintTradePrice parameter=$20.03, the price of the trade.

At step 132, the process retrieves the posting market center best bid and offer, and at step 134, it compares the PrintTradePrice ($20.03) to the posting market center's best bid ($20.00). As the PrintTradePrice is not lower than the posting market center's best bid, the process does not need to reprice any reprice-to-block buy orders, so the process continues to step 142. At step 142, the process compares the PrintTradePrice ($20.03) to the posting market center's best offer price ($20.02) and determines that the PrintTradePrice is higher. The process proceeds to step 146 and initiates the process to determine if the Last Sale constitutes a block trade at step 160 (FIG. 4).

At step 162, the process retrieves the MinBlockVolume parameter, which is currently set to 10,000 shares. At step 164, the process compares the PrintTradeVolume (10,000) to the MinBlockVolume (10,000). As the PrintTradeVolume is the same as the MinBlockVolume, it proceeds to step 165, where it checks if the trade must also meet minimum market value requirements. In this example, since this issue is an equity security, the volume and value requirements do not both need to be satisfied, and the process proceeds to step 174.

At step 174, the process sets the flag IsBlock=1 (true). At step 176, the process passes the binary value back to step 148 in the process New Last Sale Detected (FIG. 3). As the value of "IsBlock"=1, the process proceeds to step 150 to determine whether any reprice-to-block sell orders must be repriced. Step 150 invokes the process to reprice-to-block sell orders, at step 400 (FIG. 7).

At step 402, the process retrieves the first reprice-to-block sell order, Order I. At step 404, the process compares the price of Order I ($20.02) to the PrintTradePrice ($20.03). As the sell order's price is lower, at step 406, the process changes Order I's price to $20.03, the price of the PrintTradePrice. At step 408, the process inserts the repriced order in the internal book according to its new price/time priority. At step 410, the process checks to see if other sell orders with RTB=Y exist, and finding none, ends the update process at step 412.

The internal book looks like this:

| | Bids | | Offers |
|---|---|---|---|
| Order E:<br>Reserve size = 4600,<br>OriginalPrice = 20.02,<br>RTB = Y | 400 @ 20.00, | Away Market Center A | 1000 @ 20.01 |
| Order F:<br>Reserve size = 1100,<br>OriginalPrice = 20.01,<br>RTB = Y | 900 @ 20.00, | Order C: | 5000 @ 20.03 |
| Away Market Center A | 2000 @ 20.00 | Order I:<br>Reserve size = 2700,<br>OriginalPrice = 20.02,<br>RTB = Y | 300 @ 20.03, ← |
| | | Order D: | 1000 @ 20.05 |

The public posting market center order book now looks like this:

| Bids | | Offers | |
|---|---|---|---|
| Posting Market Center | 1300 @ 20.00 | Posting Market Center | 5300 @ 20.03 ← |
| | | Posting Market Center | 1000 @ 20.05 |

As with Orders E and F in the buy order example above, once repriced, Order I is never reset to its original price. However, Order I could be repriced higher. For instance, should another block trade subsequently trade at a price that is higher than Order I's current price ($20.03), Order I would be automatically repriced again, and its previous price would be stored for audit purposes as well. This process is repeated as necessary until Order I is fully executed or canceled.

EXAMPLE 11

Trade on the Tape is an Inferior Priced Block Trade, Reprice-to-Block Options Sell Order is Repriced This example, Example 11, is an equity options example and is similar to Example 10 above except that orders and quotes in an equity options issue are shown rather than the orders and quotes in an equity security issue that were shown in Example 10. The particular issue discussed in this example does not have Market Makers assigned to it and, therefore, Market Maker quotes are not discussed in this example. Even if Market Maker quotes were present, they would not be relevant to this discussion, as only orders, not quotes, can be repriced-to-block. As previously described, the definition of a block trade is different on an options market than on an equities market.

At the start of this example, the internal book looks like this. Note that Order L and Order M have already been previously repriced-to-block, as evidenced by their higher OriginalPrices:

| | Bids | | Offers | |
|---|---|---|---|---|
| Order L:<br>Reserve size = 460,<br>OriginalPrice = 2.10,<br>RTB = Y | 40 @ 2.00, | Away Market Center A | | 100 @ 2.05 |
| Order M:<br>Reserve size = 110,<br>OriginalPrice = 2.05,<br>RTB = Y | 90 @ 2.00, | Order N:<br>Reserve size = 270,<br>OriginalPrice = 2.10,<br>RTB = Y | | 30 @ 2.10, |
| Away Market Center A | 200 @ 2.00 | Order J: | | 50 @ 2.15 |

At step 120, the process detects the following Print on the Tape:

→70,000 contracts @ 2.15 traded on Away Market Center A

At step 122, the process determines that this trade did not execute on the posting market center 20, and at step 124, the process determines that this is a regular-way trade. At step 128, the process sets the PrintTradeVolume parameter=70,000, the size of the trade. At step 130, it sets the PrintTradePrice parameter=$2.15, the price of the trade.

At step 132, the process retrieves the posting market center best bid and offer, and at step 134, it compares the PrintTradePrice ($2.15) to the posting market center's best bid ($2.00). As the PrintTradePrice is not lower than the posting market center's best bid, the process does not need to reprice any reprice-to-block buy orders, so the process continues to step 142. At step 142, the process compares the PrintTradePrice ($2.15) to the posting market center's best offer price ($2.10) and determines that the PrintTradePrice is higher. The process proceeds to step 146 and initiates the process to determine if the Last Sale constitutes a block trade at step 160 (FIG. 4).

At step 162, the process retrieves the MinBlockVolume parameter, which is currently set to 500 contracts. At step 164, the process compares the PrintTradeVolume (70,000) to the MinBlockVolume (500). As the PrintTradeVolume is higher than the MinBlockVolume, it proceeds to step 165.

At step 165, the process checks whether this trade must also meet minimum market value requirements to constitute a block trade. In this example, since the issue is an equity option, the volume and value requirements both need to be satisfied, and the process proceeds to step 166. At step 166, the process retrieves the MinBlockValue parameter, which in this example is set to $150,000. At step 168, the process computes the TotalTradeValue parameter by multiplying the PrintTradeVolume parameter (70,000) by the PrintTradePrice ($2.15). The computed TotalTradeValue=$150,500. At step 170, the process compares the TotalTradeValue ($150,500) to the MinBlockValue ($150,000). As the TotalTradeValue is higher than the MinBlockValue, it determines that this trade does constitute a block trade.

At step 174, the process sets the flag IsBlock=1 (true). At step 176, the process passes the binary value back to step 148 in the process New Last Sale Detected (FIG. 3). As the value of "IsBlock"=1, the process proceeds to step 150 to determine whether any reprice-to-block sell orders must be repriced. Step 150 invokes the process to reprice-to-block sell orders, at step 400 (FIG. 7).

At step 402, the process retrieves the first reprice-to-block sell order, Order N. At step 404, the process compares the price of Order N ($2.10) to the PrintTradePrice ($2.15). As the sell order's price is lower, at step 406, the process changes Order N's price to $2.15, the price of the PrintTradePrice. At step 408, the process inserts the repriced order in the internal book according to its new price/time priority. At step 410, the process checks to see if other sell orders with RTB=Y exist, and finding none, ends the update process at step 412.

The internal book looks like this:

The public posting market center order book now looks like this:

| Bids | | Offers | |
|---|---|---|---|
| Posting Market Center | 130 @ 2.00 | Posting Market Center | 80 @ 2.15 ← |

Order N, as with other repriced-to-block orders above, never resets to its original price after it has been repriced. However, Order N could be repriced higher if necessary. For instance, should another block trade subsequently trade at a price that is higher than Order N's current price ($2.15), Order N would be automatically repriced again, and its previous price would be stored for audit purposes as well. This process is repeated as necessary until Order N is fully executed or canceled.

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

What is claimed is:

1. A method for repricing a posted limit order on a posting market center in view of a block trade executed on an away market center at an inferior price, the method comprising:
   posting a limit order on a posting market center;
   receiving data by a computing system regarding a block trade executed (a) on an away market center (b) after posting the limit order on the posting market center;
   determining by the computing system that the block trade executed at an inferior price to the limit order posted on the posting market center; and
   repricing by the computing system the limit order posted on the posting market center to the inferior price that the block trade executed at.

2. The method of claim 1, wherein the posted limit order is a buy order.

3. The method of claim 1, wherein the posted limit order is a sell order.

4. The method of claim 1, wherein the posted limit order is a reserve order.

5. The method of claim 1, wherein the posting market center operates in an equities marketplace.

| Bids | | Offers | |
|---|---|---|---|
| Order L: Reserve size = 460, OriginalPrice = 2.10, RTB = Y | 40 @ 2.00, | Away Market Center A | 100 @ 2.05 |
| Order M: Reserve size = 110, OriginalPrice = 2.05, RTB = Y | 90 @ 2.00, | Order J: | 50 @ 2.15 |
| Away Market Center A | 200 @ 2.00 | Order N: Reserve size = 270, OriginalPrice = 2.10, RTB = Y | 30 @ 2.15, ← |

6. The method of claim 1, wherein the posting market center operates in an options marketplace.

7. The method of claim 1, wherein the computing system is one or more programmed computers.

8. The method of claim 1, wherein the computing system is distributed over several physical locations.

9. A system, comprising:
- a market center memory for repricing a posted limit order on a posting market center in view of a block trade executed on an away market center at an inferior price;
- storing code for repricing the posted limit order on the posting market center in view of the block trade executed on the away market center at the inferior price;
- a processor for executing the stored code for repricing the posted limit order on the posting market center in view of the block trade executed on the away market center at the inferior price, wherein the stored code comprises:
  - code to post a limit order on the posting market center;
  - code to receive data regarding the block trade executed (a) on the away market center (b) after posting the limit order on the posting market center;
  - code to determine that the block trade executed at the inferior price to the limit order posted on the posting market center; and
  - code to reprice the limit order posted on the posting market center to the inferior price that the block trade executed at.

10. The system of claim 9, wherein the computing system is one or more programmed computers.

11. The system of claim 9, wherein the computing system is distributed over several physical locations.

12. A system, comprising:
- a computing system including at least one processor for executing code stored in at least one memory, wherein the code when executed:
  - posts a limit order on a posting market center;
  - receives data regarding a block trade executed (a) on an away market center (b) after posting the limit order on the posting market center;
  - determines that the block trade executed at an inferior price to the limit order posted on the posting market center; and
  - reprices the limit order posted on the posting market center to the inferior price that the block trade executed at.

13. The system of claim 12, wherein the computing system is one or more programmed computers.

14. The system of claim 12, wherein the computing system is distributed over several physical locations.

* * * * *